(12) United States Patent
Shakeri et al.

(10) Patent No.: US 8,745,537 B1
(45) Date of Patent: Jun. 3, 2014

(54) GRAPHICAL INTERFACE FOR MANAGING AND MONITORING THE STATUS OF A GRAPHICAL MODEL

(75) Inventors: Mojdeh Shakeri, Southborough, MA (US); Michael David Tocci, Medway, MA (US); John Ciolfi, Wellesley, MA (US); Pieter J. Mosterman, Framingham, MA (US)

(73) Assignee: The Mathworks, Inc., Natick, MA (US)

( * ) Notice: Subject to any disclaimer, the term of this patent is extended or adjusted under 35 U.S.C. 154(b) by 160 days.

(21) Appl. No.: 12/136,997

(22) Filed: Jun. 11, 2008

Related U.S. Application Data

(60) Provisional application No. 61/028,988, filed on Feb. 15, 2008.

(51) Int. Cl.
*G06F 3/048* (2013.01)

(52) U.S. Cl.
USPC .......... 715/853; 715/734; 715/736; 715/748; 715/751; 715/760; 715/810; 715/970

(58) Field of Classification Search
USPC ....................................................... 715/853
See application file for complete search history.

(56) References Cited

U.S. PATENT DOCUMENTS

| | | | |
|---|---|---|---|
| 5,481,741 A * | 1/1996 | McKaskle et al. ............ 345/522 |
| 5,644,740 A * | 7/1997 | Kiuchi ........................... 715/853 |
| 6,035,297 A | 3/2000 | Van Huben et al. |
| 6,111,578 A * | 8/2000 | Tesler ............................ 715/850 |
| 6,205,465 B1 | 3/2001 | Schoening et al. |
| 6,240,549 B1 * | 5/2001 | Hamada et al. ................ 717/130 |
| 6,625,590 B1 | 9/2003 | Chen et al. |
| 6,691,259 B1 | 2/2004 | Mackey et al. |
| 6,727,926 B1 * | 4/2004 | Utsuki et al. .................. 715/853 |
| 7,120,874 B2 * | 10/2006 | Shah et al. .................... 715/733 |
| 7,424,701 B2 * | 9/2008 | Kendall et al. ................ 717/105 |
| 7,949,673 B2 * | 5/2011 | Vanrenen et al. ............. 707/769 |
| 2002/0199173 A1 | 12/2002 | Bowen |
| 2003/0184580 A1 * | 10/2003 | Kodosky et al. .............. 345/734 |
| 2003/0200347 A1 * | 10/2003 | Weitzman ..................... 709/310 |
| 2004/0267918 A1 | 12/2004 | Guarraci et al. |
| 2005/0027845 A1 * | 2/2005 | Secor et al. ................... 709/223 |
| 2005/0195660 A1 | 9/2005 | Kavuri et al. |
| 2006/0235817 A1 * | 10/2006 | Wong et al. ....................... 707/1 |
| 2006/0265469 A1 | 11/2006 | Estrade |
| 2006/0288332 A1 * | 12/2006 | Sagar et al. ................... 717/124 |
| 2007/0245240 A1 * | 10/2007 | Hudson, Jr. ................... 715/709 |
| 2008/0141170 A1 * | 6/2008 | Kodosky et al. .............. 715/810 |
| 2009/0193298 A1 * | 7/2009 | Mukherjee ..................... 714/38 |

* cited by examiner

*Primary Examiner* — Anil N. Kumar
(74) *Attorney, Agent, or Firm* — Harrity & Harrity, LLP

(57) ABSTRACT

In an embodiment, a method for managing and monitoring a graphical top model includes executing the graphical top model. The graphical top model references multiple instances of at least one graphical model. The method also generates a graphical user interface that displays a component from a graphical model. The displayed component is referenced by at least two of the model instances. The graphical user interface displays a current calling hierarchy indicative of a specific model instance that is associated with the displayed component.

18 Claims, 21 Drawing Sheets

| Lab | Idle | Busy | Stop | Stop Location |
|---|---|---|---|---|
| 1 | | ○ | | |
| 2 | | ○ | | |
| 3 | | ○ | | |
| 4 | | | ● | in File.m at line 993 (Subsystem A) |
| 5 | | | ● | in File.m at line 953 (Subsystem B) |
| 6 | | ○ | | |
| 7 | | ○ | | |
| 8 | | ○ | | |
| 9 | | ○ | | |
| 10 | | ○ | | |
| 11 | | ⓣ | | |
| 12 | | ⓣ | | |
| 13 | | ○ | | |
| 14 | ● | | | |
| 15 | | Ⓡ | | |
| 16 | | ○ | | |

Fig. 6

GRAPHICAL INTERFACE FOR MANAGING AND MONITORING THE STATUS OF A GRAPHICAL MODEL

RELATED APPLICATION

The present application is related to a United States Patent Application entitled "Status Indicator for Concurrent Computing Units Executing a Concurrent Computing Process," application Ser. No. 11/497,878, filed on Jul. 31, 2006, the contents of which are incorporated herein by reference in their entirety. The present application also claims the benefit of a United States Provisional Patent application entitled "Graphical Interface for Managing and Monitoring the Status of a Graphical Model", Application No. 61/028,988, filed on Feb. 15, 2008, the contents of which are incorporated herein by reference in their entirety.

BACKGROUND INFORMATION

Graphical models are constructed from a variety of model components (e.g.: blocks representing functions, subsystems, etc.). In addition, a graphical model may also include one or more references to instances of the same or different graphical models. When another model is referenced, execution of the original referencing model (referred to herein as the "top model") is dependent on the execution of the referenced model(s). The referenced model(s) may be executed as part of the same computing process as the top model. Alternatively, a referenced model may be executed by a concurrent computing process executing on concurrent computing units.

Concurrent computing processes enable complex analyses and modeling operations to be performed using multiple concurrent computing units. The concurrent computing units that are executing the concurrent computing process may communicate in distributed or tightly-coupled environments. Exemplary concurrent computing processes include distributed and parallel computing processes. Distributed computing processes are part of an application or process that is segmented and executed on loosely-coupled computing devices. Parallel computing processes are part of an application or process that is segmented and executed simultaneously. A parallel process may or may not execute on separate computing devices. Exemplary concurrent computing processes include applications providing technical computing environments adapted for modeling of dynamic systems.

BRIEF DESCRIPTION OF THE DRAWINGS

The exemplary embodiments of the present invention are pointed out with particularity in the appended claims. The embodiments may be better understood by reference to the following description taken in conjunction with the accompanying drawings, in which:

FIG. 6 depicts an exemplary status report of concurrent computing units generated by the monitoring facility;

DETAILED DESCRIPTION

Overview

Exemplary embodiments of the present invention enable a user to monitor and manage the execution and/or debugging of a graphical top model. The term 'top model' is a relative term and should not be construed in an absolute sense. The graphical top model may directly or indirectly reference multiple model instances of the same graphical model. Additionally, the graphical top model may include model components directly or indirectly referencing the same display component. A graphical user interface may identify which of the model instances referenced by the graphical top model is associated with the information being displayed during the execution or debugging of the top model. This identification of a specific one of the multiple model instances referenced by the top model as the instance that is currently "calling" the displayed model or model component may allow a user to properly interpret the displayed data.

For example, in one embodiment a displayed component utilized during the execution of the graphical top model may be a software scope block that generates a window in which data values associated with a model simulation may be displayed. The data values displayed by the software scope block may change based upon which of several model instances referenced by the graphical top model called and fed data to the software scope block. The display of a calling hierarchy with the displayed component data allows a user to identify which of the several model instances referenced by the graphical top model called the displayed component (the scope). The graphical user interface may also enable a user to enter input parameters for the graphical top model and to change the currently displayed calling hierarchy.

Exemplary Model Reference Embodiments

Graphical programming languages and graphical modeling environments enable the construction of graphical models that may be used to model dynamic systems. Graphical programming languages provide a wide array of functionality that may be utilized during model design. For example, a user may graphically model a dynamic system using a block diagram model, a state diagram model, a flow diagram model, a data-flow diagram model, etc.

Graphical model designers may build a large application model using a hierarchy of one or more models that are referenced by a graphical top model. Each referenced model can be referenced multiple times in the hierarchy. Different instances of a referenced model may execute and have different states at the same or different instances in time. The state of a model may be represented with different values. The values from different model instances referenced by a graphical top model may be displayed via a common component (e.g.: a software scope).

Figure 1:
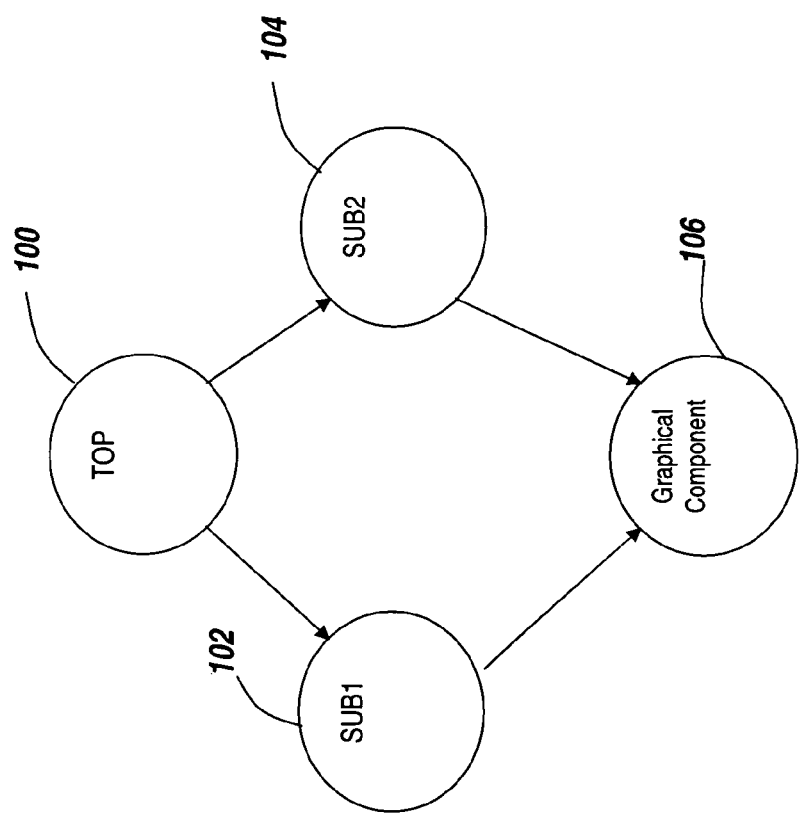
FIG. 1 depicts an exemplary top model's calling hierarchy.

For example, FIG. 1 depicts an exemplary top model's calling hierarchy. FIG. 1 depicts an exemplary model hierarchy in which a graphical top model 100 (hereafter "top model") references a first instance of a model "sub1" (102) and a second instance of the same model "sub2" (104). Both sub1 (102) and sub2 (104) may reference the same component 106 when executing. Component 106 may be a model, block or other model element referenced via more than one calling hierarchy. This scenario may pose difficulties to a user who is running or debugging top model 100, because the user viewing a display of component 106 may be left uncertain as to which instance of the referenced models (sub1 or sub2) called for the component to be displayed. Knowledge of a calling hierarchy indicating which model instance called component 106 may be important for a user in interpreting the results of a model's execution, for example, in those circumstances when sub1 (102) and sub2 (104) possess different states.

For instance, component 106 may be a software scope displaying data values associated with a model instance that is called the software scope (i.e., the model instance that requested the scope generate a window displaying data values). If sub1 (102) and sub2 (104) contain different data values, the data displayed by component 106 will differ depending upon which model instance is calling component 106. In order for a user debugging top model 100 to make sense of the data being displayed by component 106, the user needs to know whether sub1 (102) or sub2 (104) called component 106 (i.e. the user needs to know the calling hierarchy).

Similar concerns are present in the situation where a graphical user interface is being generated directly displaying a referenced model instance when the top model references multiple instances of the same model (e.g. sub1 (102) or sub2 (104)). For example a view of a referenced model may be shown that includes signal values. If the calling hierarchy is not identified, the user may be unable to tell which instance of the model called by the top model 100 is being displayed.

Exemplary embodiments provide a graphical user interface that may be used to specify all or part of a calling hierarchy detailing the particular model instance that is calling a displayed model or model component (such as component 106). This specification of a calling hierarchy may be useful in debugging a top model. For example, the ability to specify in a graphical user interface the identity of a caller of a displayed component is useful when interpreting displayed port value labels, display blocks, software scope blocks, referenced models, etc. as the user is able to identify the model instance associated with the displayed component.

In one embodiment, the calling hierarchy displayed by the graphical user interface may indicate that a model is being referenced indirectly. For example, a top model may reference two instances of different models which each reference an instance of the same model. The two instances of the same model are referenced by instances of different models but include the same top model at the root of the calling hierarchy.

An additional benefit provided by the ability to specify a calling hierarchy is that the selection of a calling hierarchy enables a user to set conditional breakpoints when debugging a top model that utilizes a component shared by at least two referenced model instances. In such a circumstance, the location of the conditional break point may depend upon the call stack for a particular calling model instance (e.g.: the location of the breakpoint, the status of the breakpoint, etc., may differ depending on whether sub1 (102) or sub2 (104) are calling component 106). The specification of the calling hierarchy simplifies the process of setting a breakpoint by providing additional information to a user.

A number of mechanisms may be used to identify a calling hierarchy and choose which particular call stack (i.e.: which referenced model instance's call stack) to include when debugging or executing a top model. For example, the title bar of the graphical user interface window may list the calling hierarchy. Similarly, the title bar of the graphical user interface window may list the calling hierarchy and provide a tool, such as a pull-down menu, by which the user may change the hierarchy. Likewise, a right click context menu may be displayed when the user clicks on a graphical component that allows a user to identify and/or select the calling instance. Tooltips may be provided in the graphical user interface when hovering a mouse or other selection tool over software scopes or signal lines. The tooltips may be accompanied by a selector mechanism. In one embodiment, a special syntax may be provided for a debugger that allows the user to specify the calling hierarchy. In alternative embodiments, other mechanisms may also be used in place or in addition to those described above. It should be appreciated that the above discussed mechanisms are merely illustrative and not an exhaustive listings of the available mechanisms for identifying and/or changing calling hierarchy when executing a top model.

Figure 2A:
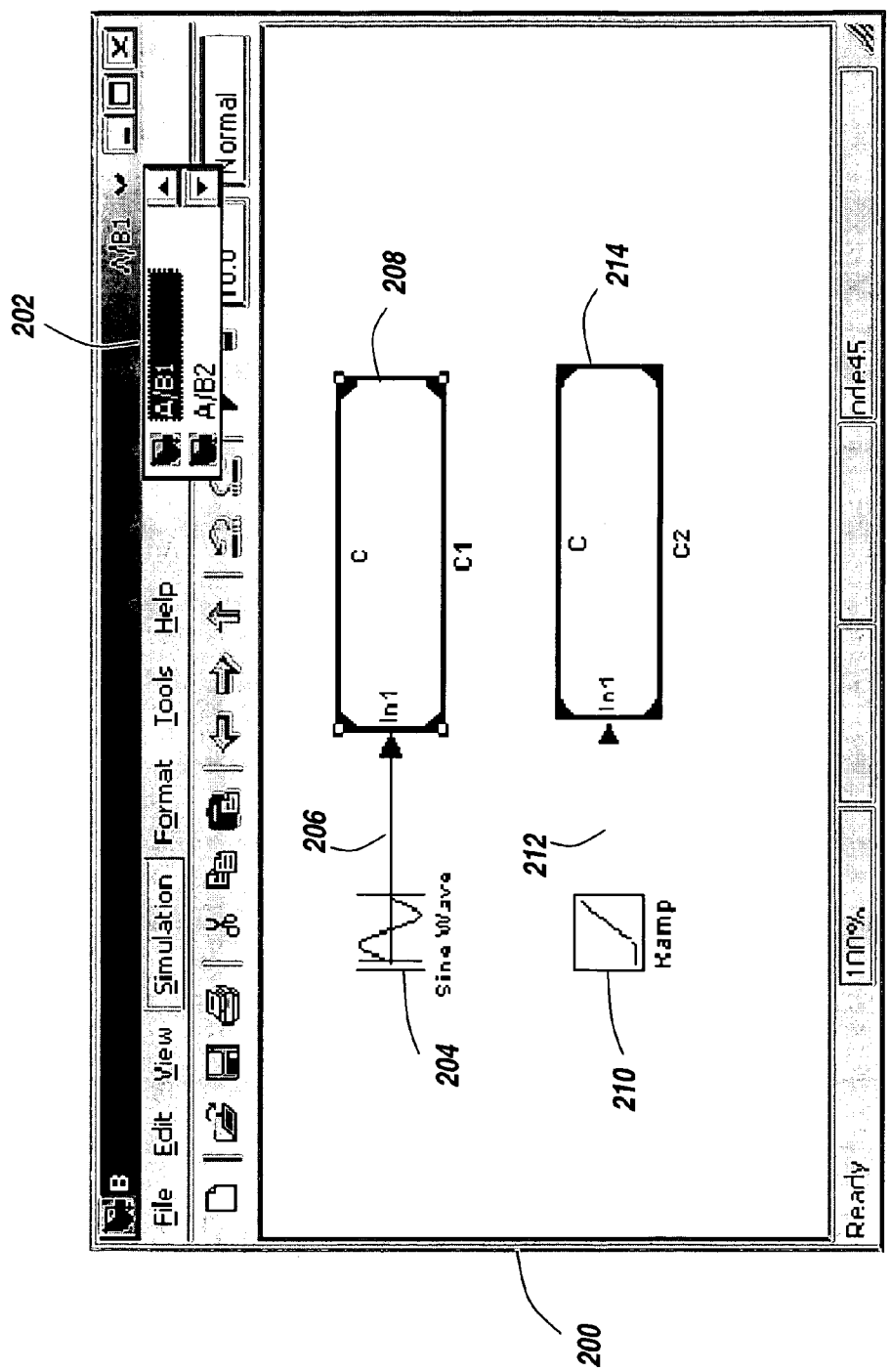
FIG. 2A depicts an exemplary graphical user interface displaying a current calling hierarchy.
Figure 2B:
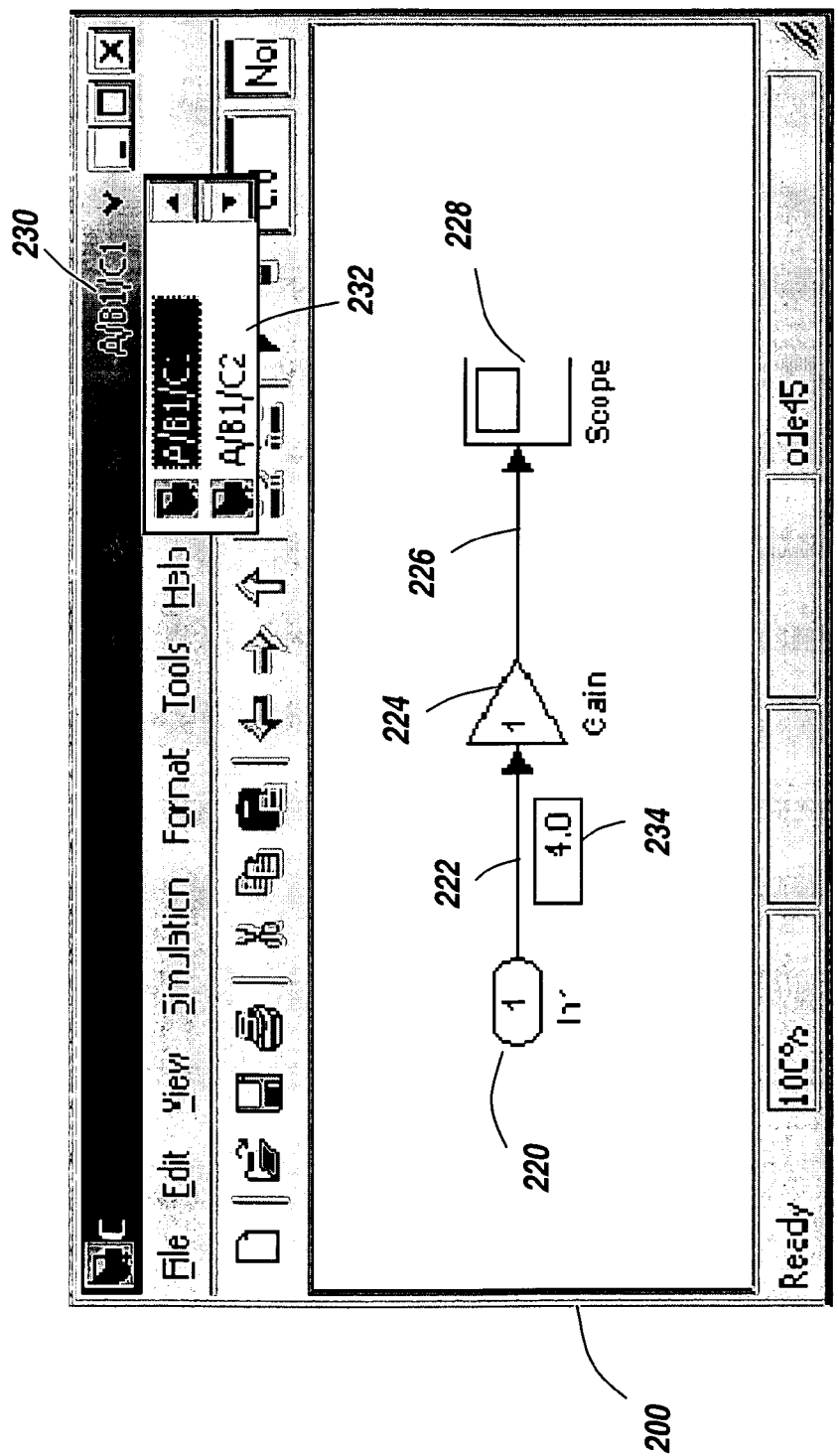
FIG. 2B depicts an exemplary graphical user interface displaying an indicator of a current calling hierarchy called by the model depicted in FIG. 2A.
Figure 2C:
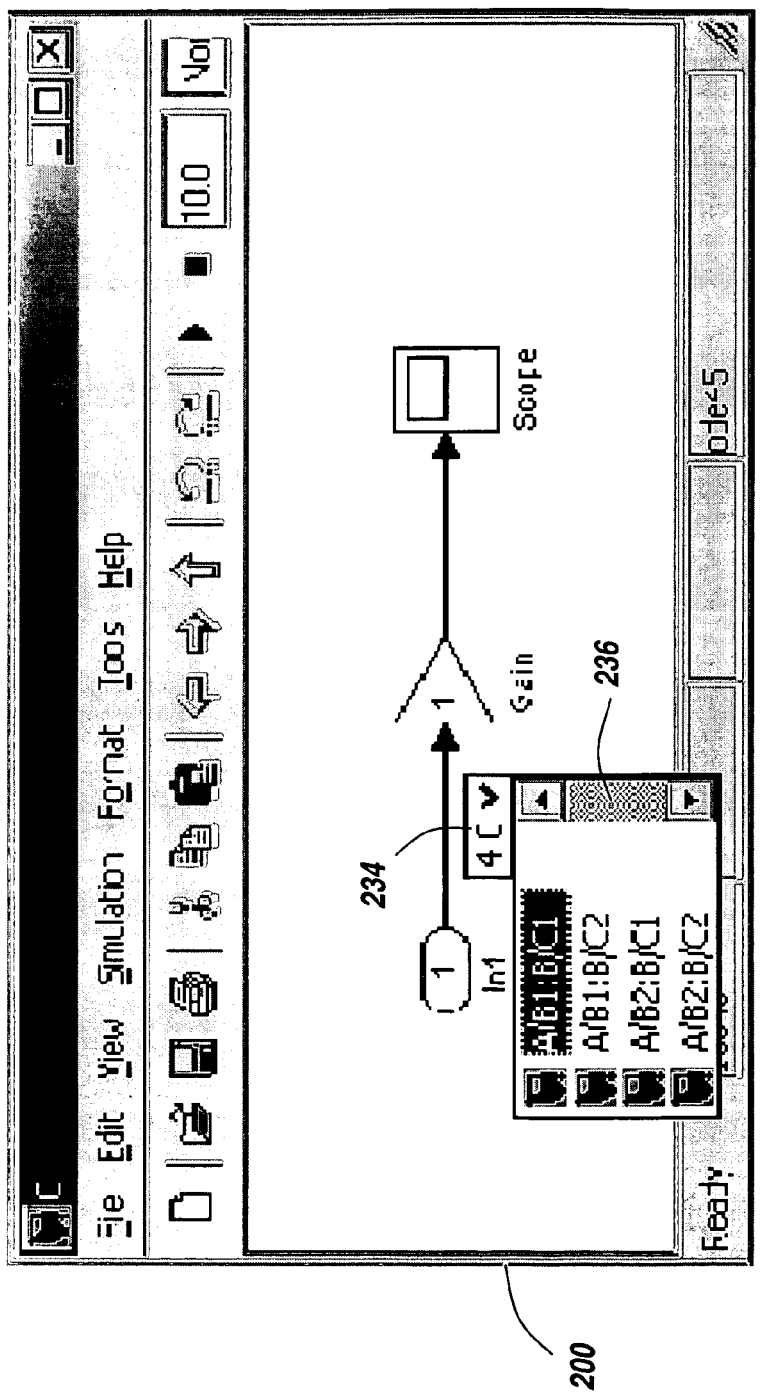
FIG. 2C depicts an exemplary alternative indicator used to display and/or select a current calling hierarchy.

Examples of different mechanisms used to display and select calling hierarchy are depicted in FIGS. 2A-2C. FIG. 2A depicts an exemplary graphical user interface 200 displaying a current calling hierarchy. The graphical user interface 200 may be used by an embodiment to display a current calling hierarchy in which a top model "A" has called an instance of a graphical model "B". A title bar pull down menu 202 indicates that the displayed model "B" in FIG. 2A is a first instance of model B referred to as "B1". The B1 instance of the model includes a Sine Wave generation block 204 providing an input signal 206 to a first instance of a model C, "C1" (208). The model instance B1 also includes a ramp signal block 210 that is providing an input signal 212 to a second instance of model C, "C2" (214).

Similarly, FIG. 2B depicts an exemplary graphical user interface 200 that includes a current calling hierarchy associated with a displayed component called by the model depicted in FIG. 2A. FIG. 2B depicts the display of a current calling hierarchy 230 in which a top model "A" has called an instance of a graphical model "B1" (depicted in FIG. 2A) which has in turn called a first instance of model C, "C1". Model C includes an input In1 (220) that provides an input signal 222 to a gain block 224. The gain block 224 provides an output signal 226 to a software scope block 228. Since the gain block has a multiplier value of 1 in this example, the output signal 226 will equal the input signal 222. The title bar for the graphical user interface 200 provides an indicator 230 that indicates that the first instance of model C, "C1" is being displayed. In one embodiment, a selection tool 232 in the form of a scrollable pull-down menu or other mechanism is provided from which the user can change the calling hierarchy. In one embodiment, model C also displays a current value 234 of the input signal 222.

FIG. 2C depicts an exemplary alternative indicator used to display and/or select a current calling hierarchy. The user may utilize this mechanism to select a different calling hierarchy. The value display for the input signal 234 may include a selector mechanism 236 that displays the current calling hierarchy and may be used to change calling hierarchy. It will be appreciated that the display and selection mechanisms discussed in FIGS. 2A-2C are intended in an illustrative sense and that other mechanisms may be used within the scope of the present invention.

Figure 2D:
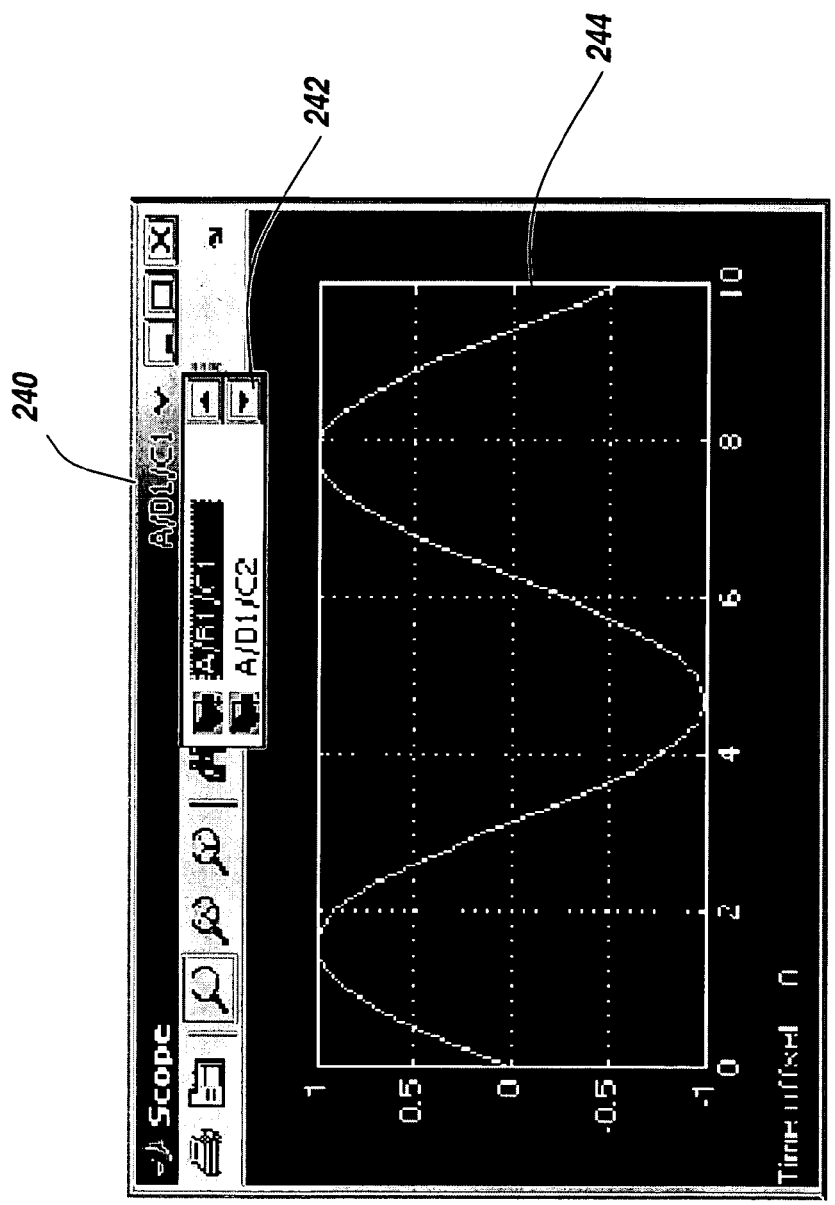
FIG. 2D is an exemplary graphical user interface displaying output and an indicator of a calling hierarchy for a component associated with multiple instances of a graphical model.
Figure 2E:
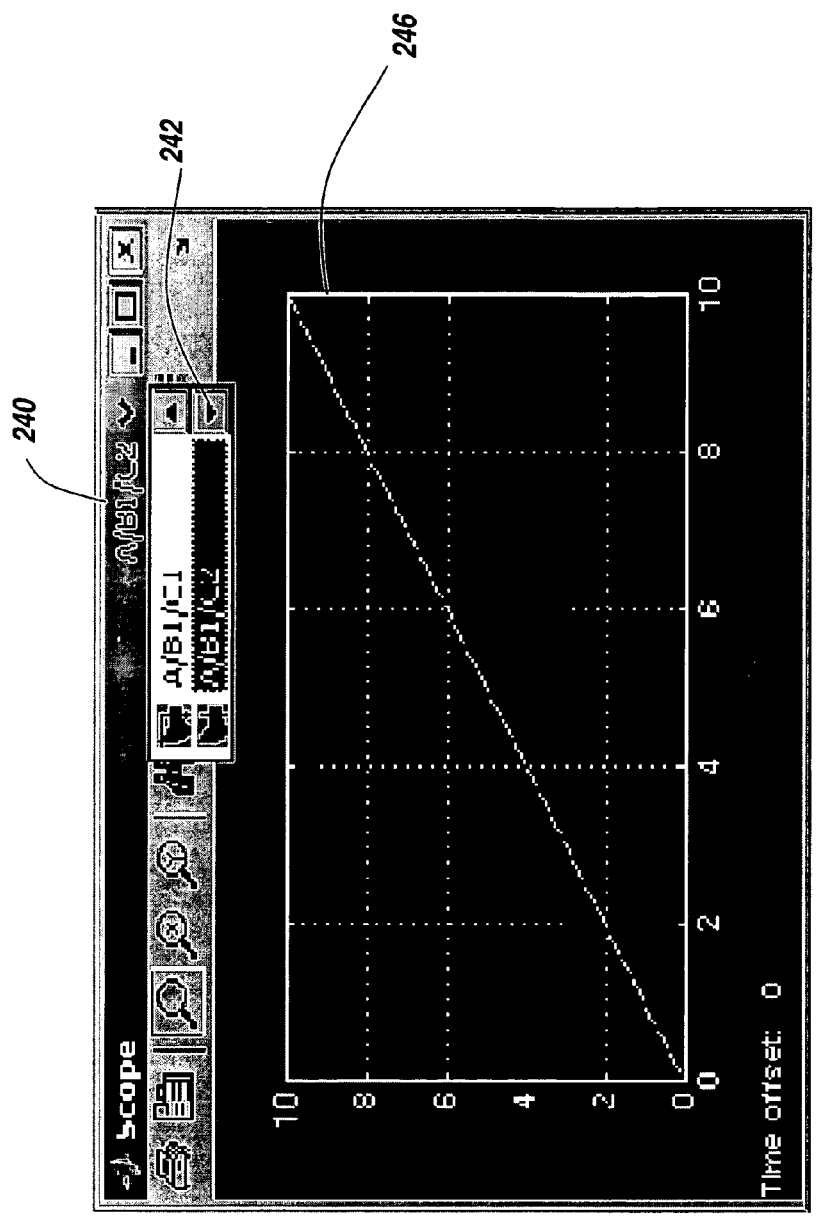
FIG. 2E is an exemplary graphical user interface displaying output and an indicator of a different calling hierarchy for a displayed component.

The effect of selecting different instances of models may be seen in reference to FIGS. 2D and 2E. FIG. 2D is an exemplary graphical user interface displaying output and an indicator of a calling hierarchy for a component associated with multiple instances of a graphical model. An indicator 240 in the title bar displaying the output from the software scope block 226 indicates that the current calling hierarchy is "A/B1/C1". A selector mechanism 242 allows the calling hierarchy to be changed by a user. The displayed signal 244 is a Sine Wave. A user viewing the displayed output is aware not only that he or she is viewing output from the software scope block, but also is aware that the software scope block is associated with the first instance of model C, "C1".

In the event the user uses the selector mechanism 242 to change the calling hierarchy to A/B1/C2, the display depicted in FIG. 2E may be shown. FIG. 2E is an exemplary graphical user interface displaying output and an indicator of a different calling hierarchy for the displayed component. The indicator 242 now indicates the current calling hierarchy is "A/B1/C2." The hierarchy indicates that it is the output from the scope block associated with the second instance of model C that is being displayed. Accordingly, as C2 accepts a ramp signal from B1, the displayed signal 246 for C2 is a ramp signal and not a Sine Wave.

In one embodiment, in addition to displaying a calling hierarchy, a graphical user interface may be used to target commands to specific components in model instances that have been referenced by a top model. The display of a calling hierarchy allows a user to selectively target commands to a particular component in a model instance referenced by the top model when debugging the top model. A number of mechanisms may be used to target commands. In an embodiment, certain displayed components may be altered by right clicking on the component and entering a new parameter utilizing a menu. For example, by right clicking on a gain block, a user may be able to change the multiplying value from 2 to 4 and observe the result. In another embodiment, clicking on a portion of a calling hierarchy in a displayed indicator (e.g.: clicking on B1 in an A/B1/C2 hierarchy) may provide a dialog box or command line into which a user can enter commands to change component values.

Exemplary Concurrent Computing Embodiments

Exemplary embodiments of the present invention may provide a graphical user interface for a concurrent computing environment. In one embodiment a graphical user interface may allow a user to monitor and manage the execution of a graphical top model being executed on multiple concurrent computing units. The graphical user interface may indicate information regarding the status of the execution of the various referenced model instances being executed in the concurrent computing environment. In an embodiment, the graphical user interface may include a selector mechanism that allows a user to select specific concurrent computer units about which the user wishes to receive information during the execution of a graphical top model. The graphical user interface may allow the user to target specific concurrent computer units to receive commands. In another embodiment, a graphical user interface may enable the debugging of a graphical top model being concurrently executed so as to allow the user to adjust tunable parameters being used for model execution.

The display of concurrent computing unit status during the execution of a graphical top model may address problems found when converting a traditional desktop modeling application into a concurrent computing process. Traditionally, a single user interface has been used for both an individual computing unit application and a concurrent computing application environment. Thus the same interface was used regardless of the number of computing units being utilized. While the output of the model being executed could be shown via the interface, the use of the traditional user interface made it difficult to differentiate and monitor the status of each concurrent computing unit in the concurrent computing environment. This inability to visualize the concurrent execution became even more significant in a graphical modeling environment where the display of a graphical model must convey information regarding the status of the execution or debugging of the graphical model on all of the concurrent computing units.

Figure 3A:
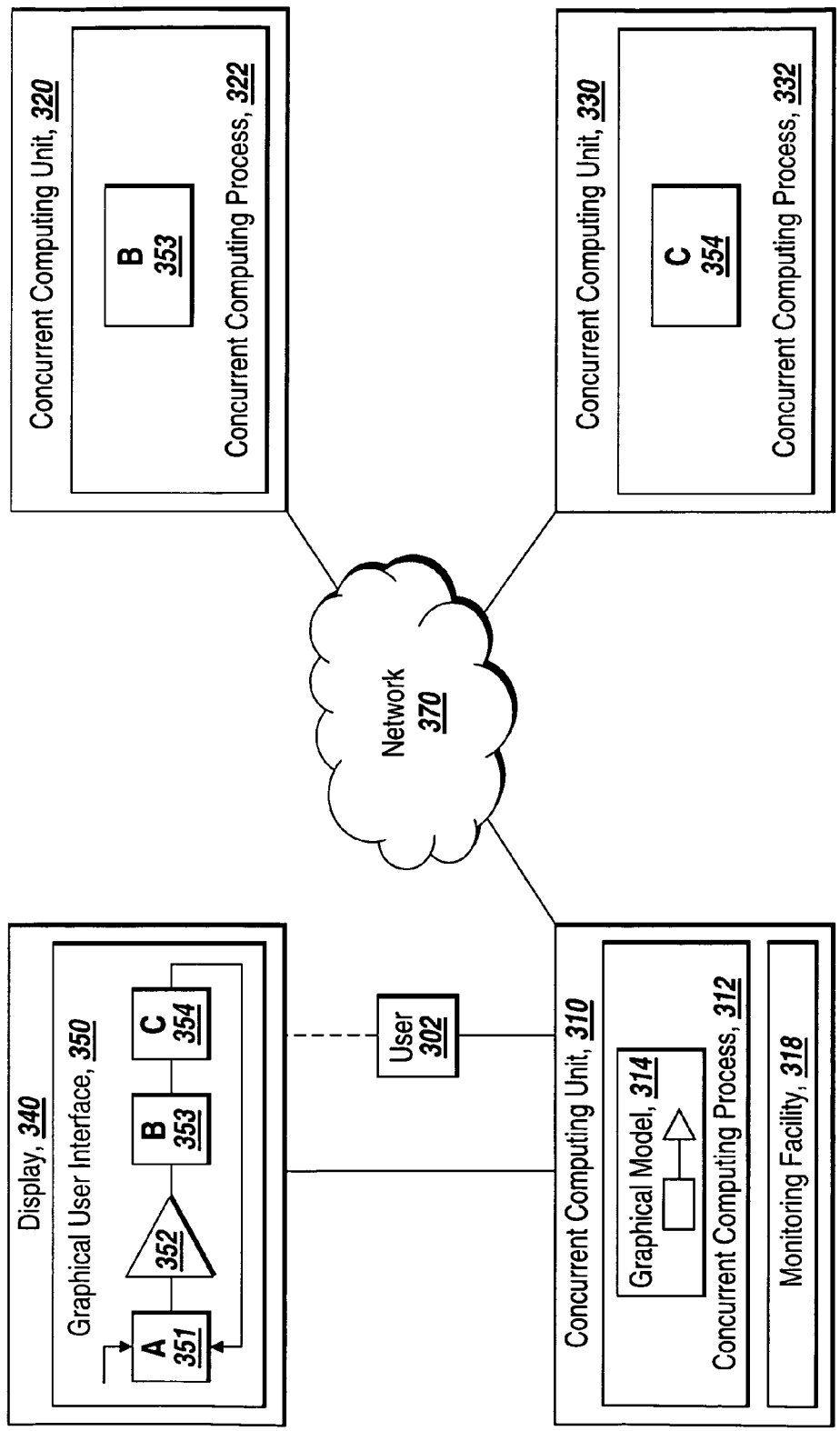
FIG. 3A depicts an exemplary concurrent computing environment suitable for sequentially executing a graphical model in a collaborative fashion.

FIG. 3A depicts an exemplary embodiment in which a graphical user interface 350 may be used to display the status of concurrent computing units sequentially executing a graphical model in a distributed fashion. Concurrent computing units 310, 320 and 330 communicate over network 370. Concurrent computing units 310, 320 and 330 may each host an instance of a graphical modeling concurrent computing process 312, 322, and 332 (hereafter concurrent computing process 312, 322 and 332, respectively). Concurrent computing units 310, 320 and 330 may use concurrent computing process 312, 322 and 332 to collaboratively execute a graphical model 314. A user 302 may be in communication with concurrent computing unit 310 and may monitor the output of graphical model 314 on a display 340 that is in communication with concurrent computing unit 310.

Graphical model 314 may be a block diagram model, a block diagram model that includes an imported UML model, a state diagram model, a flow diagram model, a data-flow diagram model, etc. The results and/or information regarding the status of the execution of graphical model 314 by concurrent computing units 310, 320 and 330 may be tracked by a monitoring facility 318 that is in communication with concurrent computing process 312, 322 and/or 332. Monitoring facility 318 is preferably implemented in software but may also be implemented in hardware. Although pictured separately as a stand-alone process in FIG. 3A, it will be appreciated that monitoring facility 318 may also be integrated into the instance of concurrent computing process 312 that is being hosted by concurrent computing unit 310 and is being accessed by user 302. Alternatively monitoring facility 318 may be implemented as a plug-in for concurrent computing process 312.

The graphical model may be displayed to user 302 via graphical user interface 350 before, during and/or after execution. In the example depicted in FIG. 3A, the graphical model displayed in GUI 350 is executed sequentially by concurrent computing units 310, 320 and 330. For example, graphical model 314 may include a subsystem A block 351, a gain block 352, a subsystem B block 353 and a subsystem C block 354. Subsystem A block 351 may provide its output as input to gain block 352. Gain block 352 may provide its output as input to subsystem B block 353. Subsystem B block may provide its output as input to subsystem C block 354. Subsystem C block 354 may provide its output as part of the input to subsystem A block 351.

Graphical model 314 may be executed in a concurrent computing environment because of a general availability of computing resources and/or because of the presence of specialized resources associated with individual concurrent computing units. Therefore, in one embodiment, subsystem A block 351 and gain block 352 may be executed by concurrent computing process 312 on concurrent computing unit 310. The output from gain block 352 may be provided as input to subsystem B block 353 being executed by concurrent computing process 322 on concurrent computing unit 320. Similarly, the output from subsystem B block 353 may be provided as input to subsystem C block 354 being executed by concurrent computing process 332 on concurrent computing unit 330. The output from the execution of the subsystem C block 354 may then be provided to concurrent computing unit 310 for use as input in the execution of subsystem A block 351.

During the execution of graphical model 314 by concurrent computing units 310, 320 and 330, a view of graphical model 314 in graphical user interface 350 may be updated. Monitoring facility 318 may receive information regarding the status of the execution of graphical model 314 by concurrent computing process 312, 322 and 332 that is displayed via graphical user interface 350. A graphical indicator may be provided in the graphical user interface 350 to indicate the current status of the execution of graphical model 314 by concurrent computing units 310, 320 and 330. The displayed information may include a calling hierarchy or other identifier that identifies the portion of graphical model 314 that is being executed on the respective concurrent computing units.

Figure 3B:
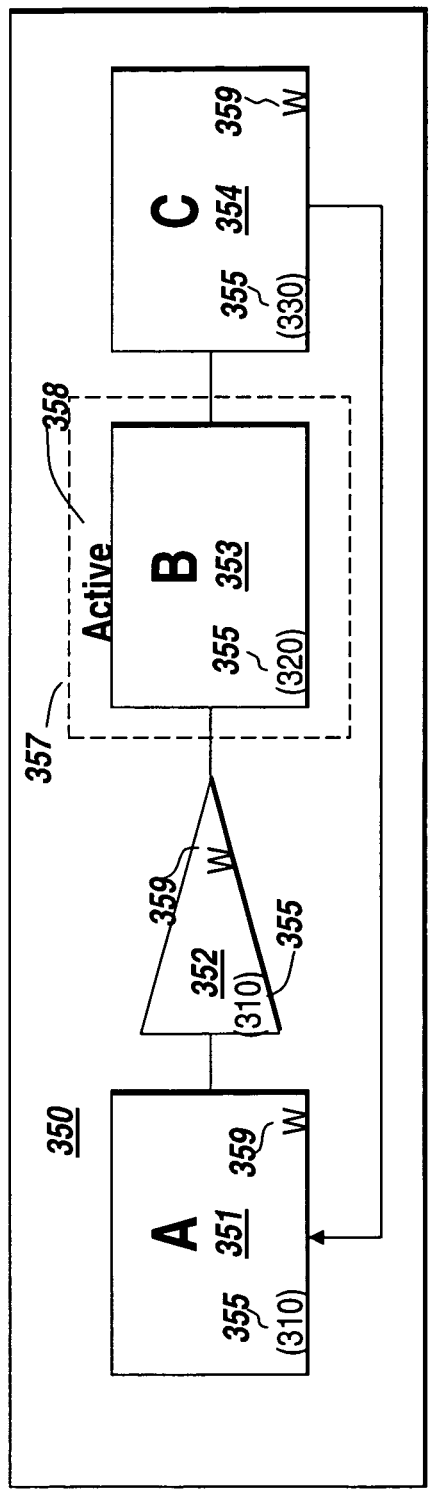
FIG. 3B depicts an exemplary display of the graphical model of FIG. 3A by the graphical user interface.

For example, FIG. 3B depicts exemplary graphical user interface 350 during the execution of the model described in FIG. 3A. Each of model components 351, 352, 353 and 354 may have indicators 355 that indicate which concurrent computing unit 310, 320 and 330 is responsible for the execution of that model component. Thus, subsystem block A 351 and gain block 352 may have indicators 355 indicating that they are to be executed by or are being executed by concurrent computing unit 310. Subsystem B block 353 has an indicator 355 indicating that it is to be executed by or is being executed by concurrent computing unit 320. Similarly subsystem C block 354 has an indicator 355 indicating that it is to be executed by or is being executed by concurrent computing unit 330.

Additionally, for concurrent processing of sequentially executed models, the graphical user interface 350 may indicate which concurrent computing unit is currently active and executing. Thus, a dashed box 357 may be placed around the subsystem B block 353 that includes a label 358 indicating that the block is now "active". Similarly, an indicator 359 such as a 'W' for "waiting" may be added to subsystem A block 351, gain block 352 and subsystem C block 354 to inform a user that those blocks are not currently being executed. It will be appreciated, that instead of boxes and labels, colors and/or designs may also be utilized to indicate which model components are currently being executed. For example, subsystem C block 353 which is active could be displayed in the color green while the remainder of the model components could be displayed in red. It will further be appreciated that model parameter information and calculated results may also be displayed in the graphical user interface 350.

Figure 4A:
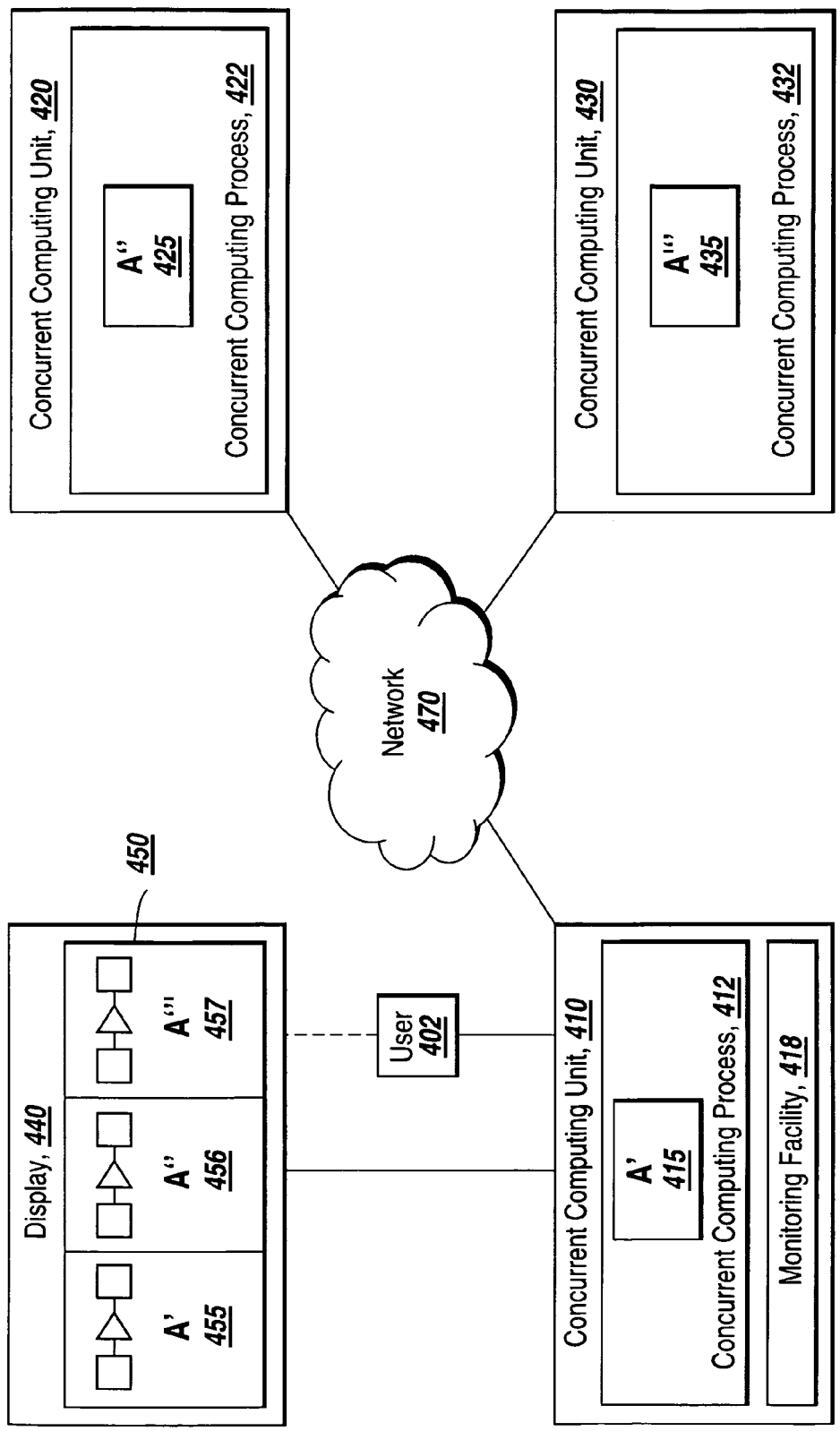
FIG. 4A depicts an exemplary concurrent computing environment suitable for concurrently executing different versions of a graphical model.

A concurrent computing environment may also be used to execute multiple instances of the same model using different parameters. FIG. 4A depicts an exemplary embodiment in which a graphical user interface is used to display the status of different instances of a graphical model that are being concurrently executed using different parameter information. A graphical model 'A' is concurrently executed by the concurrent computing units 410, 420 and 430 using different parameter information. In one embodiment, the parameter information may be input by a user. Thus, concurrent computing process 412 on concurrent computing unit 410 may execute an instance of graphical model A with a first set of parameter information (referred to herein as A' (415)). Concurrent computing process 422 on concurrent computing unit 420 may execute a different instance of the same graphical model A using a second set of parameter information (referred to herein as A" (425)). Concurrent computing process 432 on concurrent computing unit 430 may execute another instance of graphical model A using a third set of parameter information (referred to herein as A'" (435)).

Figure 4B:
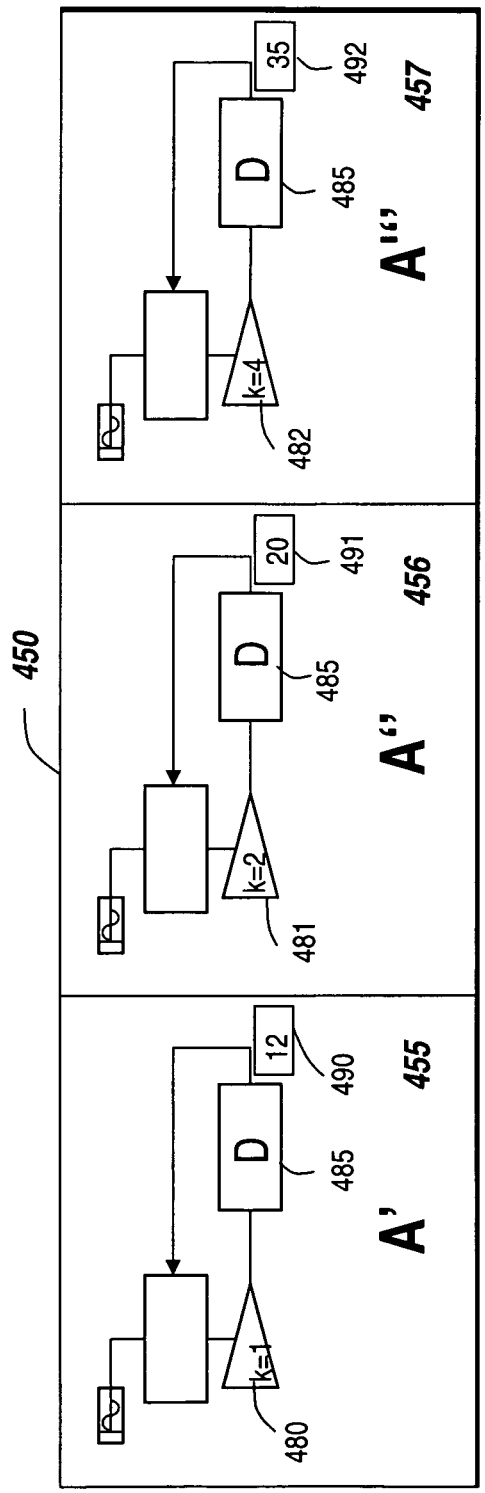
FIG. 4B depicts an exemplary display of the graphical model versions of FIG. 4A by the graphical user interface.

Graphical user interface 450 may dynamically display information regarding the status of the concurrent execution of the versions of the graphical model A, A' (455), A" (456) and A'" (457), to a user viewing a display 440 that is communicating with concurrent computing unit 410. For example, as illustrated in FIG. 4B, an exemplary graphical user interface 450 may indicate that model instance A' (455) is executing a gain block with a parameter of 1 (480) and that the output of subsystem block D (485) is currently 12 (490). Similarly, graphical user interface 450 may indicate that model instance A" (456) is executing a gain block with a parameter of 2 (481) and that the output of subsystem block D is currently 20 (491). Likewise, graphical user interface 450 may indicate that model instance A'" (457) is executing a gain block with a parameter of 4 (482) and that the output of subsystem block D is currently 35 (492). Although FIG. 4B depicts the views of the model instances A', A" and A'" as being displayed in a side by side fashion, it will be appreciated that they may also be displayed one at a time, pair wise, etc., with a control allowing a user to toggle between the model instances. A calling hierarchy or other indicator may be provided so that a user can determine which model instance is being displayed. The views of the model instances may alternatively be consolidated into a single displayed model view which contains information about some or all of the model instances being executed by the concurrent computing process. For example, a gain block representation could list three different values in three different colors while the output of a subsystem block could also be listed in three different colors with each color assigned to one of the model instances being executed.

Figure 5A:
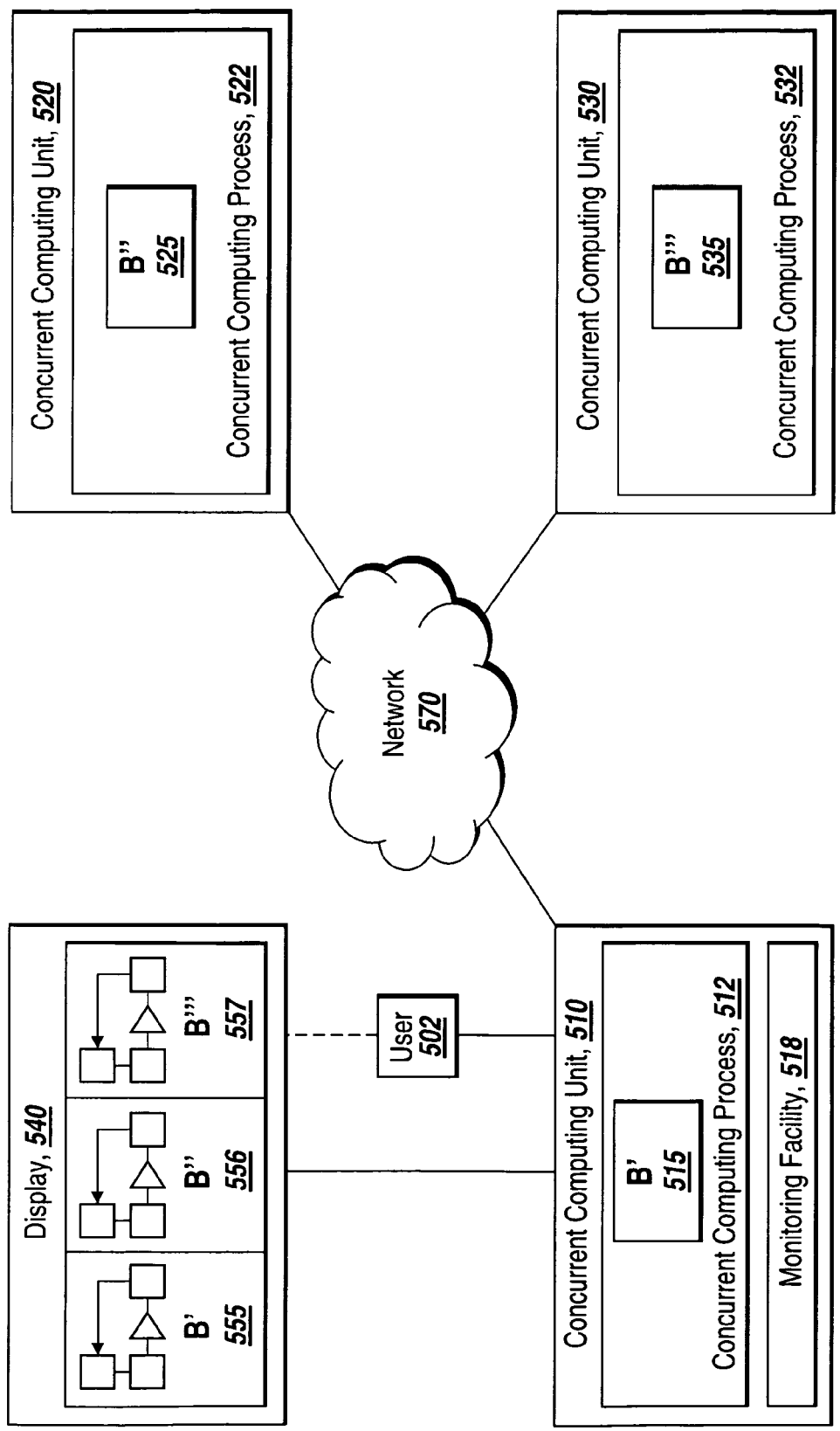
FIG. 5A depicts an exemplary concurrent computing environment suitable for concurrently executing different versions of a graphical model in a debug mode.

In another example, FIG. 5A depicts an exemplary embodiment in which a graphical user interface is used to display the status of a graphical model being concurrently executed in a debug mode. The different instances of the concurrent computing process may execute different versions of the graphical model or may execute the same version of the graphical model but with breakpoints located at different portions of the model. For example, a graphical model 'B' may be concurrently executed by concurrent computing units 510, 520 and 530 in a debug mode using different input parameter information or different breakpoints. Thus, concurrent computing process 512 on concurrent computing unit 510 may execute a model instance with a breakpoint set to a first location (referred to as model instance B' (515)). Concurrent computing unit 520 may execute another instance of the same model that has a breakpoint set in a different location (referred to as model instance B" (525)). Concurrent computing unit 530 may execute the same graphical model instance but without setting any breakpoints (referred to as model version B'" (535)). Graphical user interface 550 may dynamically display the status of the concurrent execution of the model instances, B'(555), B"(556) and B'"(557), to a user viewing display 540.

Figure 5B:
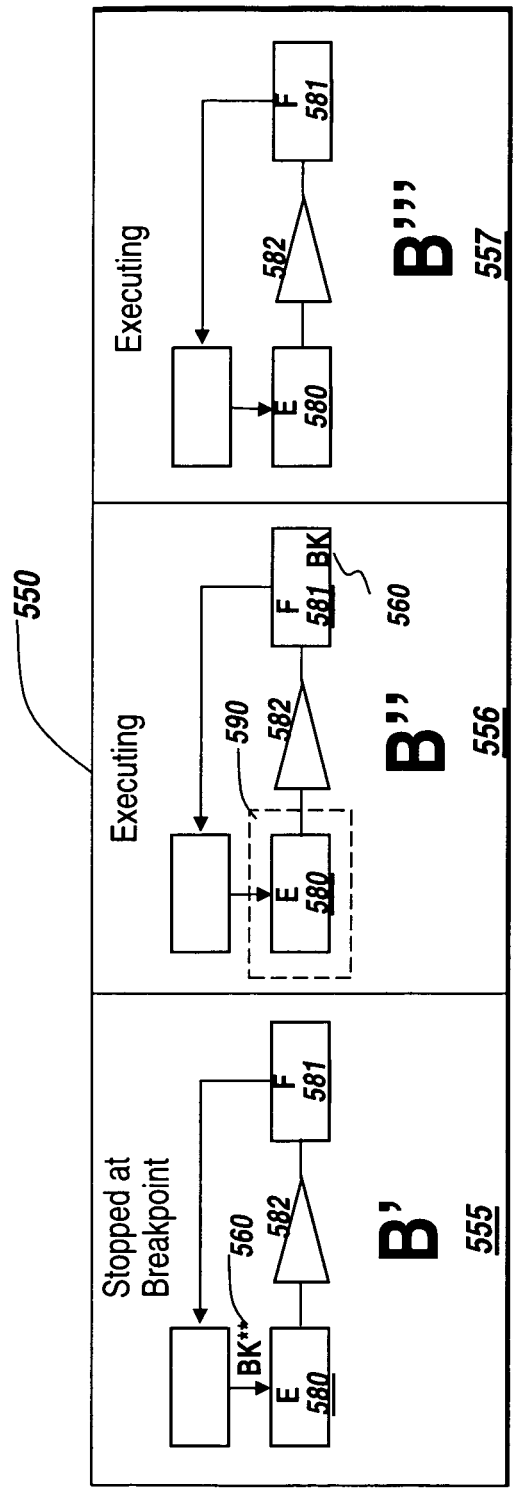
FIG. 5B depicts an exemplary display of the graphical model versions of FIG. 5A by the graphical user interface.

For example, as illustrated in FIG. 5B, exemplary graphical user interface 550 may indicate that model instance B' (555) includes a breakpoint 560 just prior to executing subsystem block E (580) and that execution of the model instance is currently stopped at the breakpoint. Similarly, graphical user interface 550 may indicate that model version B" (556) includes a breakpoint 560 in subsystem block F (581) but may indicate that the model version is currently executing at another indicated location 590. Likewise, graphical user interface 550 may indicate that model version B'" (557) contains no breakpoints and is currently executing. In one embodiment, when graphical user interface 550 indicates a concurrent computing unit is stopped at a breakpoint, graphical user interface 550 may display additional information such as current model parameter and variable values.

Figure 5C:
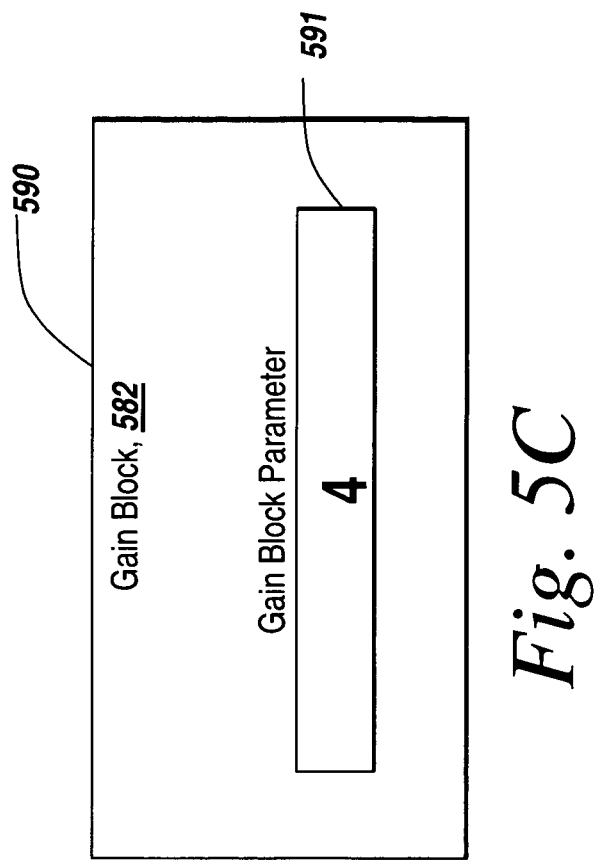
FIG. 5C depicts an exemplary dialog box for a model component enabling the user to add or edit model parameters for the component.

In one embodiment, exemplary graphical user interface 550 enables a user to tune parameters for the model instances being executed. For example FIG. 5C depicts a dialog box 590 that may be displayed in response to a user clicking on the gain block 582 of FIG. 5B. The dialog box 590 allows the user to set or adjust a value 591 for the gain block 582. As a result, the user is able to quickly adjust the execution of the model based on the user's level of satisfaction with the displayed results.

In one embodiment a user may target commands to specific concurrent computing units. The graphical user interface allows a user to visualize the execution of the graphical model by the different instances of the concurrent computing process. By selecting, via the graphical user interface, model components in a graphical model being executed by a particular instance of the concurrent computing process, the user may change parameters, start execution, stop execution, conditionally stop execution via breakpoints and otherwise manage and monitor the execution of the graphical model during both regular and debug modes of execution. The graphical user interface may also include a user interface control, such as a pull down menu or the like, that allows a user to target one or more computational units of a concurrent computing process. Alternatively, the user may select the concurrent computing units by clicking on a graphical representation of the units with a mouse. Once one or more units have been targeted, any command issued will be directed to the target unit(s). Additionally, when any of the concurrent computing units are in debug mode, the user will be able to target any single concurrent computing unit or all or a subset of units stopped at breakpoints.

Exemplary UML Embodiment

In one embodiment a graphical top model may reference one or more models based on or including a UML model (the usage of the term 'UML Model' should be understood to include derived formalisms such as SysML and MARTE and other formalisms such as AADL, etc.). UML is a modeling and specification language used in software engineering. UML is often used for modeling object-oriented programs as it includes a standardized modeling notation that may be used to create an abstract representation ("UML model") of a system. While UML was designed to specify, visualize, construct, and document software-intensive systems, UML is not restricted to modeling software and can be used for modeling systems in general. For example, UML can also be used for business process modeling, engineered system modeling, and modeling of organizational structure, etc.

In one embodiment, a UML model may be imported into a graphical model, which may then be executed as described herein. Techniques for importing a UML model into a graphical model are discussed in pending U.S. application Ser. No. 11/436, 475, filed on May 17, 2006, entitled "Action Languages for Unified Modeling Language Model," the contents of which are incorporated by reference herein in their entirety. One exemplary embodiment thus allows UML models to be concurrently executed by a concurrent computing process.

Exemplary Embodiments Reporting Execution Results

In one embodiment, the monitoring facility may be used to generate reports or other displays of information received from the concurrent computing units regarding the status of execution of the graphical model. The information may relate to data generated from the execution of the graphical model or may relate to information on the status of the concurrent computing units. Examples of status or activity values for concurrent computing units include idle (no work to do), busy performing a computation, busy sending data to another processor, busy receiving data from another processor and stopped at a known execution point. In one embodiment, additional information not initially displayed in the graphical user interface may be accessed through a link or reference included in the graphical user interface. For example, statistics related to recent activity such as the percentage of time spent waiting to receive data from another processor or the number of times data was sent to another processor may be displayed Similarly, statistical plots of the additional information may be generated as a result of a user selecting a reference or link in the graphical user interface. Such information can be used for tracking the progress of a computation and for assessing the performance of the computational system and the algorithms being employed.

In a similar vein, reports may also be generated relating to model data associated with the execution of the graphical model in the concurrent computing environment. For example, current output signal values, current accumulated values, current input values, etc.

FIG. 6 shows an exemplary report that may be generated by the monitoring facility in the form of a table 600 listing the status of each concurrent computing unit (referred to as a lab). The table columns display the status of multiple labs 610 including indicators of whether the lab is idle 620, busy 630 or stopped 640. The table 600 also lists where in the code associated with the graphical model component that is being executed the lab has stopped 650. For example, the lab '4' is indicated to have stopped at line 993 (651) which is associated with subsystem block A while the lab '5' is indicated to have stopped at line 953 (652) which is associated with subsystem block B. In the case of busy labs the table 600 may also display whether or not the lab is transmitting (T) 632 or receiving (R) 634 using Message Passing Interface (MPI). The table 600 shows the status of concurrent computing units in a scrollable list. In another embodiment, the table may indicate which method was executed (e.g. 'initialize', 'enable', 'update', 'output', 'derivative', 'zero crossing', etc.).

The table 600 may also be extended to include additional columns with other statistics. In some embodiments, the table may serve as a gateway to more detailed information such as statistical plots (e.g. profiling information). Conventional mechanisms such as double clicking or making a selection from a context menu may provide access to the detailed information. A subset of the concurrent computing units may be differenced so as to compare a subset of concurrent computing units to compare the length of time the units ran, the resources used, how long the units took to process certain elements of a job and other types of comparisons. Additionally, the collection of data indicating active concurrent computing units may be programmatically evaluated and further processed before being presented to a user. Other implementations or configurations will be apparent to one skilled in the art given the benefit of this disclosure.

Exemplary Processing

Figure 7:
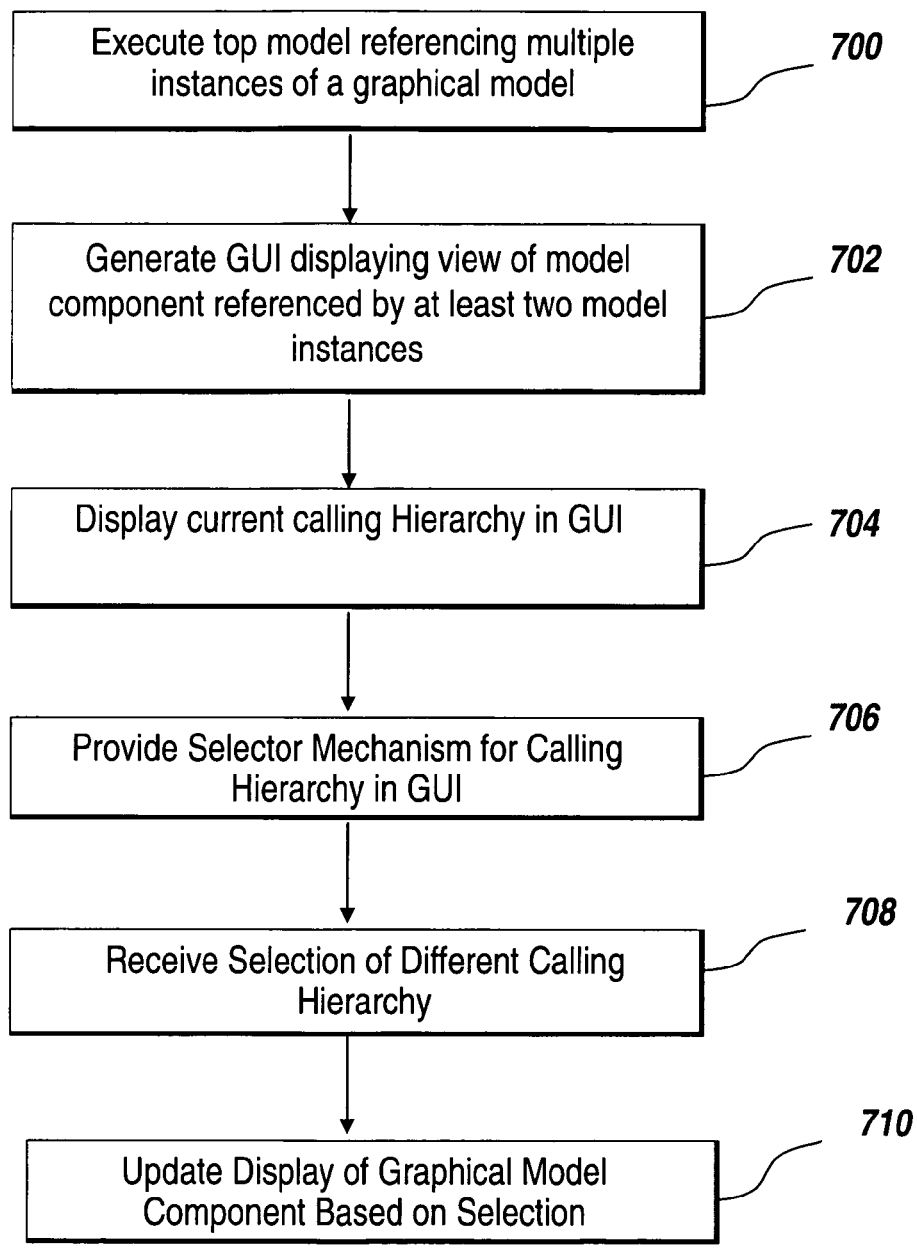
FIG. 7 is a flowchart of exemplary processing performed by an embodiment to change calling hierarchy.

As noted above in the discussion of FIGS. 2A-2E, embodiments of the present invention may be used to display a calling hierarchy during the execution of a graphical top model. FIG. 7 depicts exemplary processing that may be performed by an embodiment to display a calling hierarchy to a user. The processing begins with the execution or debugging of a graphical top model that references multiple instances of a graphical model (step 700). A graphical user interface is generated which displays a model component referenced by at least two of the model instances (step 702). The GUI may display the current calling hierarchy (step 704) and may provide a selector mechanism allowing a user to change the current calling hierarchy (step 706). The selector mechanism may be used to change the current calling hierarchy (step 708), and the display of the graphical model component may then be updated based upon the received selection (step 710).

Figure 8:
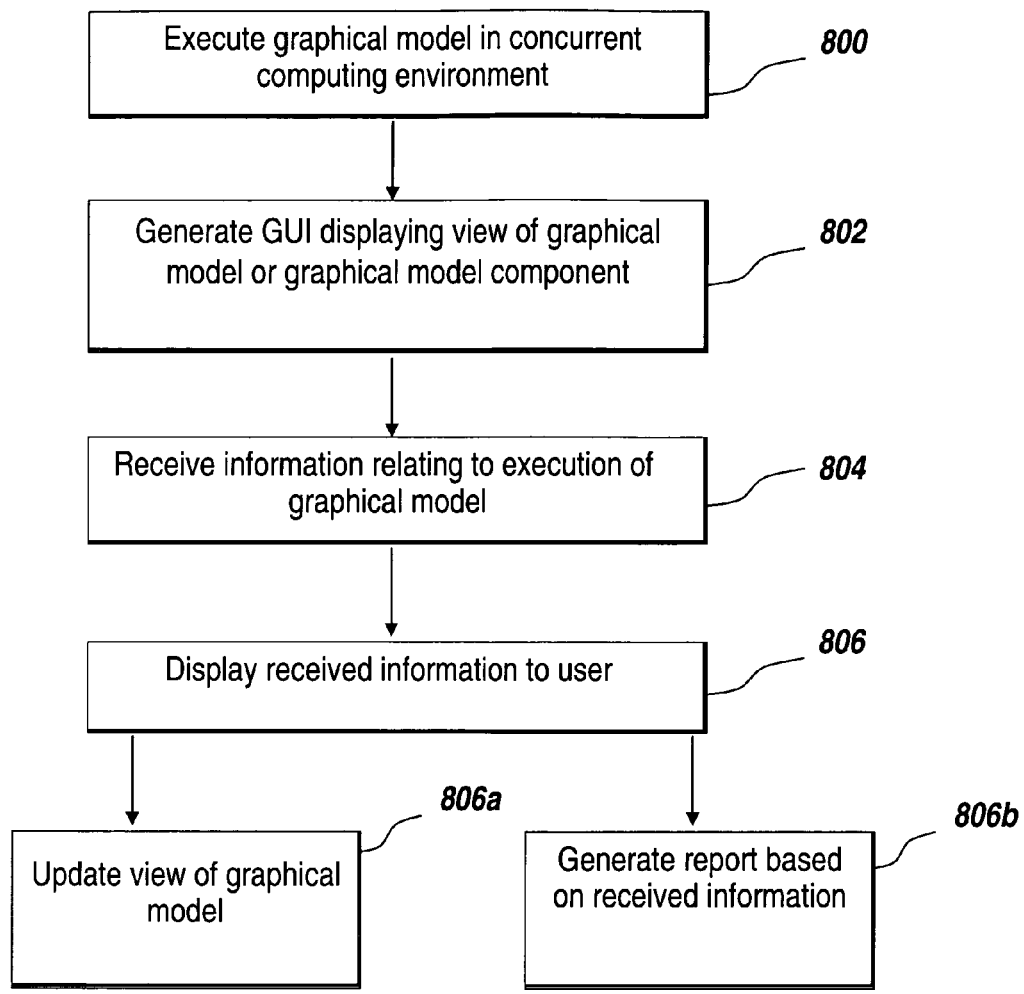
FIG. 8 depicts exemplary processing performed to display information related to the concurrent execution of a graphical model.

As noted above in the discussion of FIGS. 3A-5C, embodiments of the present invention may be used to display information regarding the concurrent execution of a graphical top model. A monitoring facility regularly may receive information from concurrent computing units carrying out the execution of the graphical model. An exemplary process by which the monitoring facility generates a graphical user interface in order to display received information to the user is depicted in the flowchart of FIG. 8. The sequence begins with the execution of a graphical model in a concurrent computing environment (step 800). A GUI may be generated that includes a view of the graphical model or model component (step 802). For example, where the graphical model is a block diagram, the GUI may display a block diagram of a whole model or particular subsystem block in the graphical model. Information regarding the execution of the graphical model may then be received from the concurrent computing units regarding the execution of the graphical model (step 804) and the received information may be displayed to the user (step 806). For example, a monitoring facility may update the displayed view of the graphical model in the graphical user interface (step 806*a*) based upon new information. Thus, where the graphical user interface is already displaying a block diagram, the display may be updated. For example, the graphical user interface may be updated by adding or altering indicators on the model such as signal values, breakpoints, status information, etc. Alternatively, a monitoring facility may generate a report about the execution of the model based on received information. For example, in one embodiment, a table such as the one depicted in FIG. 7 may be generated (step 806*b*).

Figure 9:
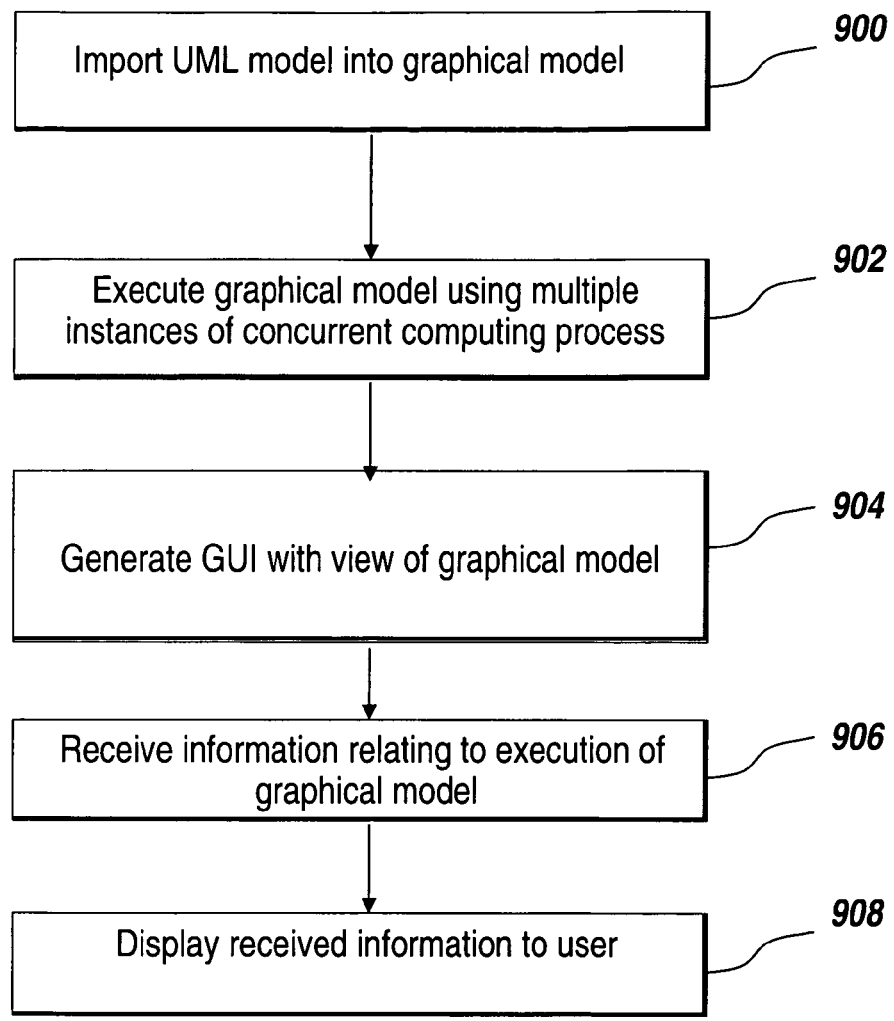
FIG. 9 depicts exemplary processing performed to display information related to the concurrent execution of a graphical model following the importation of a UML (Unified Modeling Language) model into the graphical model.

A similar process may be used when the graphical model has incorporated a UML model. An exemplary process of generating a graphical user interface that displays information to a user about the execution of a graphical model that includes a UML model is depicted in the flowchart of FIG. 9. The exemplary sequence begins with the importation of a UML model into a graphical model (step 900). The UML model may be exported into a text-based format, such as an XML Metadata Interface (XMI) format. The graphical modeling environment being used to create a graphical model may read the XMI format and publish the components of the XML model using hierarchical computational blocks. The computational blocks may be then be used in a graphical model under construction. The graphical model is then executed using a concurrent computing process (step 902). A GUI is generated that includes a view of the graphical model or a graphical model component (step 904). Information may then be received by a monitoring facility or other entity regarding the execution of the graphical model (step 906) and the received information may then be displayed to the user (step 908).

Exemplary Architectures

Figure 10:
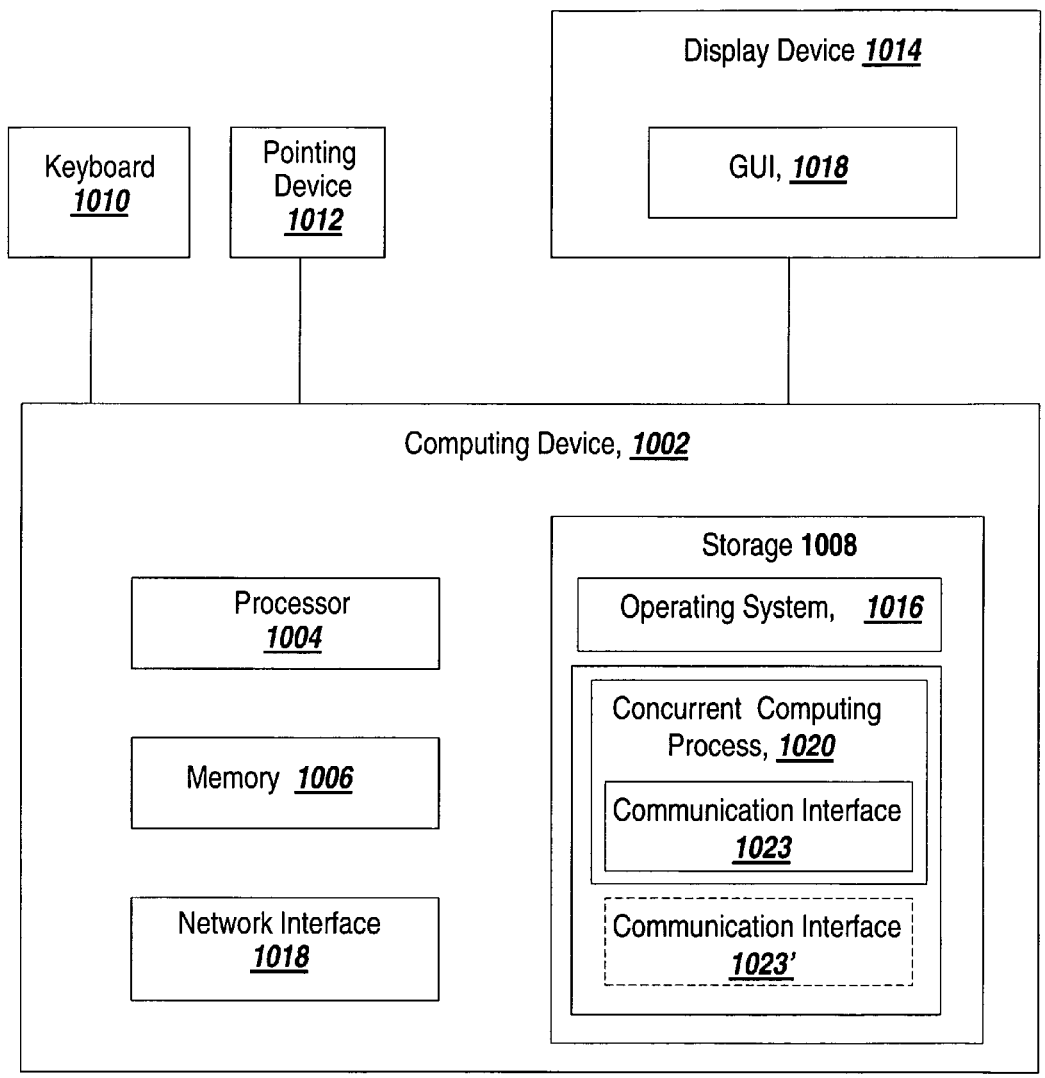
FIG. 10 is a block diagram of an exemplary computing device suitable for practicing an embodiment.

FIG. 10 depicts a computing device suitable for use with an exemplary embodiment. Computing device 1002 includes memory 1006, on which software according to one embodiment may be stored, one or more processors 1004 for executing software stored in memory 1006, and other programs for controlling system hardware. Each of the one or more processors 1004 can be a single or a multiple core processor. Virtualization can be employed in computing device 1002 so that infrastructure and resources in the computing device can be shared dynamically. Virtualized processors may also be used with concurrent computing process 1020 and other software in storage 1008. A virtual machine can be provided to handle a process running on multiple processors so that the process appears to be using only one computing resource rather than multiple. Multiple virtual machines can also be used with one processor. Other computing resources, such as FPGA, ASIC, ASIP, DSP, GPU, and GPP, may also be used for executing code and/or software. A hardware accelerator can additionally be used to speed up the general processing rate of computing device 1002. Computing device 1002 may also include analog hardware and data acquisition applications.

Memory 1006 may comprise a computer system memory or random access memory such as MRAM, DRAM, SRAM, EDO RAM, etc. Memory 1006 may comprise other types of memory as well, or combinations thereof. A user may interact with computing device 1002 through a display device 1014 such as a computer monitor, which may include a graphical user interface (GUI) 1018. The computing device 1002 may include other I/O devices such a keyboard 1010 and a pointing device 1012, for example a mouse, for receiving input from a user. Optionally, keyboard 1010 and pointing device 1012 may be connected to display device 1014. The computing device 102 may also include other suitable I/O peripherals such as, multi-point touch interfaces, cameras and microphones and may use neural interfaces. Computing device 1002 may further include a storage device 1008, such as a hard-drive, solid-state drive, FLASH memory, or CD-ROM, for storing an operating system 1016 and other related software, and for storing a concurrent computing process 1020, such as parallel computing with MATLAB® software or SIMULINK® software or distributed computing with MAT- LAB® software or SIMULINK® software (MATLAB® software and SIMULINK® software are both products of The MathWorks, Inc. of Natick, Mass.). Concurrent computing process 1020 can be, but is not limited to, an application, a program, a module, or a script. Concurrent computing process 1020 provides a concurrent computing environment to enable concurrent computing on the computing device 1002. Concurrent computing process 1020 can also include a communication interface 1023, such as Message Passing Interface (MPI), CORBA or other suitable interface, for setting up a communication channel with another computing device to form a collaboration. MPI is a standard for an interface for message passing that has been used between parallel machines or workstations in concurrent computing systems. One of ordinary skill in the art will appreciate that communication interface 1023 can be adapted to be included as part of concurrent computing process 1020, or it can be a stand-alone application, module, script, or program that responds to calls from concurrent computing process 1020, such as communication interface 1023'. Additionally, operating system 1016 and concurrent computing process 1020 can be run from a bootable CD, such as, for example, KNOPPIX®, a bootable CD for GNU/Linux.

Computing device 1002 may include a network interface 1018 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 1018 may be a FireWire interface, FlexRay interface, RS-232 interface and may include a built-in network adapter, network interface card, PCMCIA network card, card bus network adapter, wireless network adapter, USB network adapter, modem or any other device suitable for interfacing computing device 1002 to any type of network capable of communication and performing the operations described herein. Moreover, computing device 1002 may be any computer system such as a workstation, desktop computer, server, laptop, handheld computer, sensor, actuator or other form of computing or telecommunications device that is capable of communication and that has sufficient processor power and memory capacity to perform the operations described herein.

Computing device 1002 can be running any operating system such as any of the versions of the Microsoft® Windows® operating systems, the different releases of the UNIX and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein.

Figure 11:
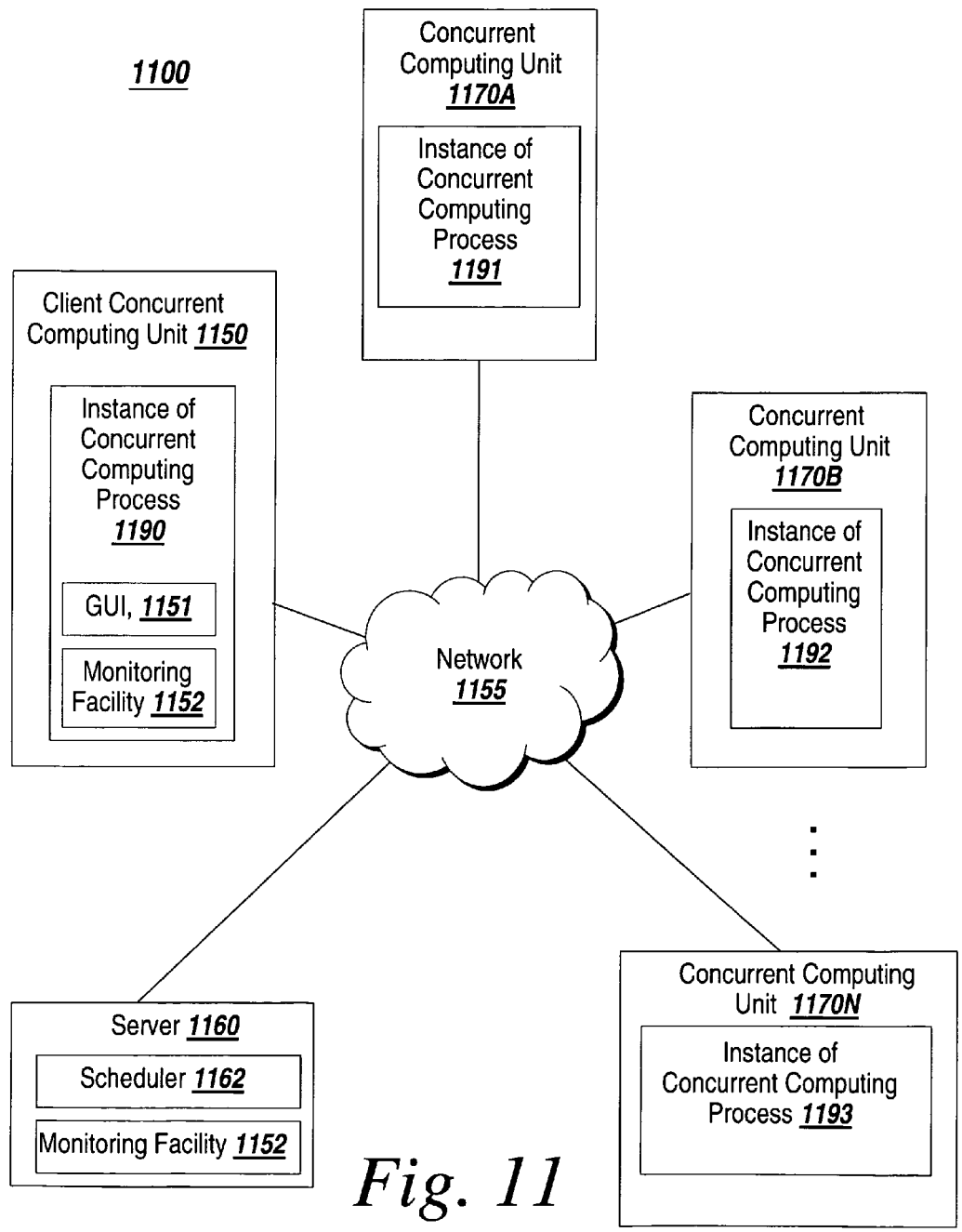
FIG. 11 is a block diagram of an exemplary concurrent computing system suitable for practicing an exemplary embodiment.

FIG. 11 depicts a concurrent computing system 1100 that is suitable for practicing exemplary embodiments. In brief overview, concurrent computing system 1100 includes client concurrent computing unit 1150, concurrent computing units (which are also referred to as "labs" herein) 1170A-N, and optionally server 1160. A concurrent computing unit or lab is a computing resource that performs distributed computing or parallel computing. A computing resource can be a processor, a computer system, or other hardware or software with computational capabilities. Client concurrent computing unit 1150 may be in communication with concurrent computing units 1170A-N and server 1160 through network 1155. Concurrent computing units 1170A, 1170B . . . 1170N may be located on the same or different computing resources.

Client concurrent computing unit 1150 and concurrent computing labs 1170A-N are configured to perform distributed computing or parallel computing using concurrent computing process 1120. Concurrent computing process 1120 may be a technical computing software application that provides a technical computing and/or graphical modeling environment that generates block diagram models and defines mathematical algorithms for simulating models. Concurrent computing process 1120 may include all or a portion of the functionality provided by a corresponding stand-alone desktop application. Concurrent computing unit 1150 and 1170A-N may execute an instance 1190, 1191, 1192 or 1193 of the concurrent computing process 1120. For example, each concurrent computing unit 1170A to 1170N and the client concurrent computing unit 1150 may each be executing a different copy of a graphical modeling application. The instance of the concurrent computing process 1190 executed on client concurrent computing unit 1150 may differ from the instances of concurrent computing processes 1191, 1192 and 1193 in that it also includes a graphical user interface 1151 and is an interactive instance of the concurrent computing process. The interactive instance of the concurrent computing process is able to accept input from a user and display output to the user during the execution of the concurrent computing process. Graphical user interface 1151 may display the information collected by a monitoring facility 1152. Graphical user interface 1151 allows a user accessing client 1150 to control and monitor all of the executing instances 1190, 1191, 1192 and 1193 of the concurrent computing process.

Concurrent computing process 1190, which is executed by client concurrent computing unit 1150, may also include monitoring facility 1152. Alternatively, monitoring facility 1152 may be part of, or in communication with, scheduler 1160. Monitoring facility 1152 may be in communication with client concurrent computing unit 1150 and concurrent computing units 1170A, 1170B . . . 1170N and may track the current activity and status of each concurrent computing unit.

In one embodiment, functions are defined by client concurrent computing unit 1150 with an application programming interface (API) and/or programming language, representing a technical computing task to be executed by either a technical computing environment local to client 1150, or remotely on workstations 1170A-N. A graphical user interface may be built on top of the API layer. Tasks can be declared on client concurrent computing unit 1150 and additionally organized into jobs. A job is a logical unit of activities, or tasks that are processed and/or managed collectively. A task defines a technical computing command to be executed, the number of arguments and any input data to the arguments. A job is a group of one or more tasks.

In another embodiment, a task can be directly distributed by client concurrent computing unit 1150 to one or more computing resources, such as concurrent computing units 1170A-N. A computing resource performs technical computing on a task and may return a result to client concurrent computing unit 1150.

In an exemplary embodiment, system 1100 may include server 1160 on which scheduler 1162 runs. Scheduler 1162 can be a scheduler provided with concurrent computing process 1120, a generic scheduler, or a third-party scheduler that is designed and provided by a company or individual that does not provide concurrent computing process 1120. Server 1160 communicates over network 1122 to concurrent computing units 1170A-N and client concurrent computing unit 1150. One of ordinary skill in the art will appreciate that any of concurrent computing units 1170A-N may include more than one technical computing lab. Additionally, client concurrent computing unit 1150 and server 1160 may also include one or more concurrent computing labs.

Scheduler 1160 may include one or more application software components to provide for the automatic distribution of tasks from client concurrent computing unit 1150 to one or more of concurrent computing units 1170A-N. Scheduler 1160 allows client concurrent computing unit 1150 to delegate the management of task distribution to scheduler 1160. Scheduler 1160 may also set up for client concurrent computing unit 1150 concurrent computing units 1170A-N by using the information received from client concurrent computing unit 1150 regarding the number of concurrent computing labs needed and other configuration information. Hence, client concurrent computing unit 1150 does not need to know the specifics of concurrent computing units 1170A-N. Client concurrent computing unit 1150 can define a function to submit the task to scheduler 260, and get a result of the task from scheduler 1160. As such, scheduler 1160 provides a level of indirection between client concurrent computing unit 1150 and concurrent computing units 1170A-N.

The use of a scheduler eases the distributed programming and integration burden on client concurrent computing unit 1150. Client concurrent computing unit 1150 does not need to have prior knowledge of the availability of concurrent computing units 1170A-N. For multiple task submissions from client concurrent computing unit 1150, scheduler 11160 can manage and handle the delegations of the tasks to concurrent computing units 1170A-N. Scheduler 1160 can also hold the results of the tasks on behalf of client concurrent computing unit 1150 for retrieval after the completion of technical computing of all the tasks distributed by client concurrent computing unit 1150. In an alternative implementation, concurrent computing units 1170A-N may provide to client concurrent computing unit 1150 directly the results of the tasks assigned to concurrent computing labs 1170A-N by scheduler 1160. Scheduler 1160 may further include an object-oriented interface to provide control of delegating tasks and obtaining results in system 1100. Scheduler 1160 may also provide an interface for managing a group of tasks collectively as a single unit called a job. Additionally, scheduler 1160 may, on behalf of client concurrent computing unit 1150, submit those tasks making up the job and obtain the results of each of the tasks until the job is completed. The functions and operations of scheduler 1160 may be separated into various software components, applications and interfaces. Additionally, the functions and operations of scheduler 1160 may reside on either client concurrent computing unit 1150 or one of concurrent computing units 1170A-N instead of server 1160.

Client concurrent computing unit 1150, the server 1160, and the concurrent computing units 1170A-N may run the same or different operating systems with the same or different processors. For example, client concurrent computing unit 1150 can be running Microsoft® Windows®, server 1160 can be running a version of UNIX, and concurrent computing units 1170A-N can be running a version of Linux. Alternatively, Client concurrent computing unit 1150, server 1160 and concurrent computing units 1170A-N can be running Microsoft® Windows®. Various combinations of operating systems and processors that can be running on any of the computing devices (client 1150, server 1160, concurrent computing units 1170A-N, etc).

In one embodiment, graphical user interface 1151 is provided for monitoring the status of model instances and components being executed by concurrent computing process 1190, 1191, 1192 and 1193. Monitoring facility 1152 may be in communication with concurrent computing units 1170A-N and may be kept apprised of the status of the concurrent computing units 1150 and 1170A-N. In one implementation, monitoring facility 1152 may first register with each of concurrent computing units 1170A-N prior to receiving any information. As noted previously, monitoring facility 1152 may also be part of, or in communication with, scheduler 1162. Monitoring facility 1152 may store the information in a global list or other type of data structure. Using the status information graphical user interface 1151 may be generated to provide a visual indication of the status of the execution of the graphical model in the concurrent computing environment.

In an exemplary embodiment, graphical user interface 1151 may display a view of a graphical model being executed by the concurrent computing process. Graphical user interface 1151 may display the status of the sequential execution of the graphical model by a concurrent computing process. Graphical user interface 1151 may also display the status of the concurrent execution of the graphical model by multiple or all instances of the concurrent computing process as a composite view or multiple views. Graphical user interface 1151 may also display the status of the execution of the graphical model in a debugging mode. As noted above, the graphical user interface may also be utilized to monitor the execution of a UML model included in a graphical model and may be used to target commands to the concurrent computing units to affect the execution of a stopped or executing graphical model.

Figure 12A:
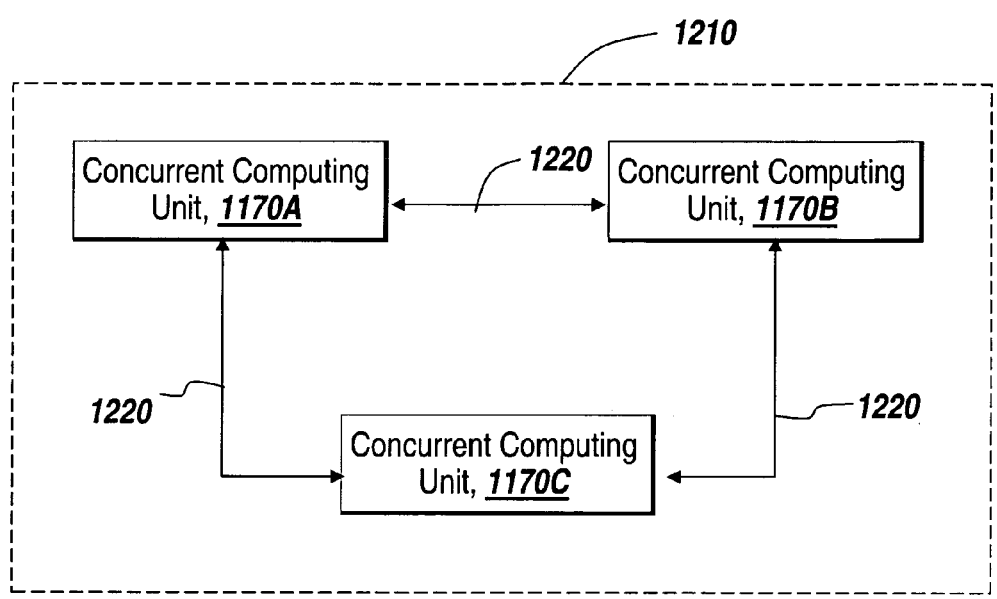
FIG. 12A is a block diagram illustrating an exemplary collaboration of concurrent computing labs in an exemplary embodiment.

Concurrent computing units 1170A, 1170B, and 1170C may be arranged in an exemplary collaboration such as is shown in FIG. 12A. Here, concurrent computing units 1170A, 1170B, and 1170C establish communication channel 1220 and form collaboration 1210. Concurrent computing labs 1170A, 1170B, and 1170C may communicate via an MPI communication channel 1220. In other embodiments, concurrent computing units 1170A, 1170B, and 1170C can interface via socket-based communications over TCP/IP implementing a custom message specification. In further embodiments, concurrent computing units 1170A, 1170B, and 1170C may communicate using any available messaging communications products and/or custom solutions that allow the sending and receiving of messages among concurrent computing units 1170A, 1170B, and 1170C. Various types of interfaces may be used with concurrent computing labs 1170A, 1170B, and 1170C.

In one embodiment, collaboration 1210 is dynamic. In other words, a user can modify or change the size of the collaboration by adding another computing resource. On client concurrent computing unit 1150, the user may be provided with a graphical user interface to modify or change the size of the collaboration or designate a specific resource to add or remove from the collaboration. In another embodiment, client concurrent computing unit 1150 can forward the collaboration information to scheduler 1160, which will determine a concurrent computing lab to be added or removed from the collaboration.

Figure 12B:
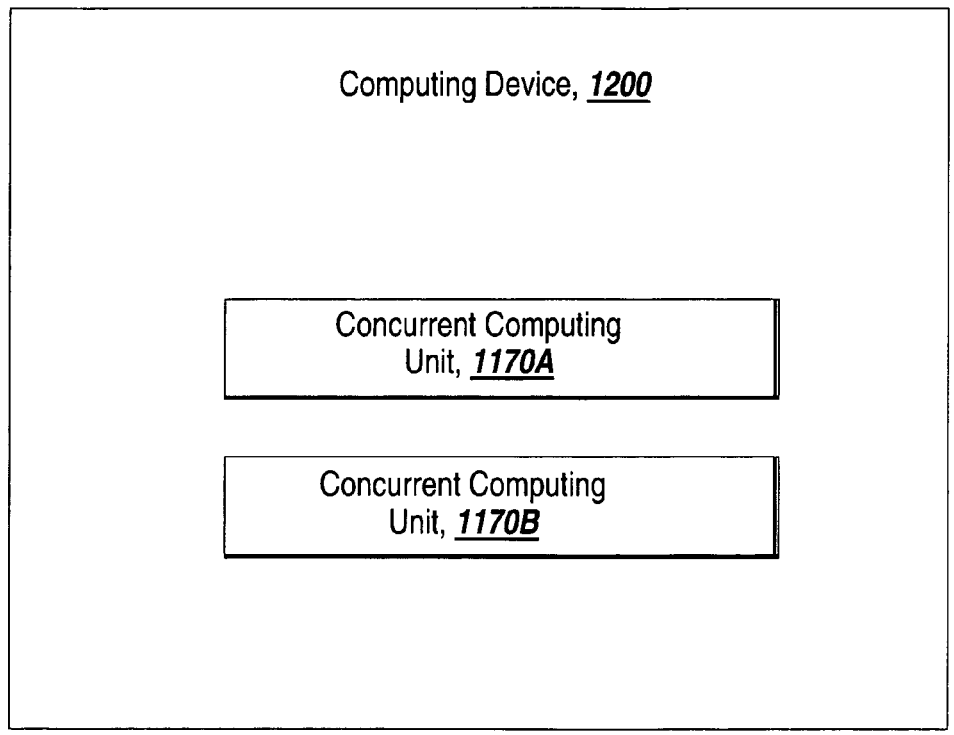
FIG. 12B is a block diagram of concurrent computing units on a single computing device.

Alternatively the concurrent computing units may be arranged in a tightly coupled environment such as is shown in FIG. 12B. Computing device 1200 includes a first concurrent computing unit 1170A and a second concurrent computing unit 1170B. In this embodiment, a concurrent computing unit may be a processor, a multiple core processor, multiple processors, or other hardware or software components with computational capability, such as a microcontroller, virtual machine application specific integrated circuit, analog hardware or field-programmable gate arrays.

CONCLUSION

Although many embodiment discussed herein have been illustrated with reference to a distributed network, it should be appreciated that the examples discussed herein may also be practiced in a tightly coupled environment. It should further be appreciated that many of the visualization techniques and command targeting techniques discussed in the distributed computing embodiments section may also be practiced with model reference embodiments. It should also be noted that although reference has been made herein to the practice of illustrative embodiments with a graphical user interface, other interface modalities may also utilized.

The embodiments of the present invention may be provided as one or more computer-readable programs embodied on or in one or more computer-readable mediums. The mediums may be a floppy disk, a hard disk, a compact disc, a digital versatile disc, a flash memory card, a PROM, an MRAM, a RAM, a ROM, or a magnetic tape. In general, the computer-readable programs may be implemented in any programming language. Some examples of languages that can be used include MATLAB, FORTRAN, C, C++, C#, Python or Java. The software programs may be stored on or in one or more mediums as object code. Hardware acceleration may be used and all or a portion of the code may run on a FPGA, an ASIP, or an ASIC. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 7-9, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations depicted in FIGS. 1-5C and FIGS. 10-12B depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

We claim:

1. One or more non-transitory computer readable media storing instructions, the instructions comprising:
   a plurality of instructions that, when executed by one or more processors, cause the one or more processors to:
      execute a first graphical model that references a plurality of instances of a second graphical model,
         the plurality of instances of the second graphical model including:
            a first instance of the second graphical model, and
            a second instance of the second graphical model;
      provide for display, by a graphical user interface, particular information indicating that a component is referenced by the first instance of the second graphical model during execution of the first graphical model,
         the particular information including a graphical representation of the component and a graphical representation of the first instance of the second graphical model;
      provide for display, by the graphical user interface and with the particular information, a selector mechanism identifying first information and second information,
         the selector mechanism indicating that the first information is selected,
         the first information indicating that the first graphical model is referencing the first instance of the second graphical model and that the first instance, of the second graphical model, is referencing the component, and
         the second information indicating that the first graphical model is referencing the second instance of the second graphical model and that the second instance, of the second graphical model, is referencing the component;
      receive, via the selector mechanism, a selection of the second information;
      update, based on the selection of the second information, the particular information to obtain updated particular information that indicates that the component is being referenced by the second instance of the second graphical model,
         the updated particular information including the graphical representation of the component and a graphical representation of the second instance of the second graphical model; and
      provide the updated particular information for display by the graphical user interface.

2. The media of claim 1, where the instructions further comprise:
   one or more instructions to generate a tool tip in the graphical user interface,
      the tool tip displaying information relating to:
         the first graphical model referencing the first instance of the second graphical model and the first instance, of the second graphical model, referencing the component, or the first graphical model referencing the second instance of the second graphical model and the second instance, of the second graphical model, referencing the component.

3. The media of claim 1, where one or more instructions, of the plurality of instructions, to execute the first graphical model comprise:
one or more instructions to execute the first graphical model with the first instance of the second graphical model to obtain one or more first results,
the first instance, of the second graphical model, using a first set of input data during the execution of the first graphical model;
one or more instructions to execute the first graphical model with the second instance of the second graphical model to obtain one or more second results,
the second instance, of the second graphical model, using a second set of input data during the execution of the first graphical model;
one or more instructions to display the one or more first results and the one or more second results.

4. The media of claim 1, where the instructions further comprise:
one or more instructions to provide the selector mechanism for display in a title bar of a window for the graphical user interface.

5. The media of claim 1, where the selector mechanism is a pull-down menu or a context menu.

6. The media of claim 1, where the first graphical model is a block diagram model.

7. The media of claim 6, where the first graphical model is created based on a UML (Unified Modeling Language) model.

8. The media of claim 1, where the instructions further comprise:
one or more instructions to execute the first graphical model in a debugging mode.

9. The media of claim 1, where the instructions further comprise:
one or more instructions to provide, for display, information indicating that at least one of the first instance, of the second graphical model, or the second instance, of the second graphical model, is stopped at a breakpoint.

10. The media of claim 1, where one or more instructions, of the plurality of instructions, to execute the first graphical model include:
one or more instructions to receive user input parameters;
one or more instructions to transmit the user input parameters to the first instance of the second graphical and the second instance of the second graphical model for use during the execution of the first graphical model; and
one or more instructions to execute, using the user input parameters, the first graphical model, the first instance of the second graphical model, and the second instance of the second graphical model.

11. The media of claim 10, where the instructions further comprise:
one or more instructions to adjust the user input parameters, during the execution of the first graphical model, based on input from a user.

12. The media of claim 1, where the instructions further comprise:
one or more instructions to provide a user interface enabling a user to target a command to the first instance of the second graphical model or the second instance of the second graphical model.

13. A system comprising:
a processor to execute instructions to:
execute a first graphical model that references a plurality of instances of a second graphical model,
the plurality of instances of the second graphical model including:
a first instance of the second graphical model, and
a second instance of the second graphical model,
provide for display, by a graphical user interface, particular information indicating that a component is referenced by the first instance during execution of the first graphical model,
the particular information including a graphical representation of the component and a graphical representation of the first instance,
provide for display, by the graphical user interface and with the particular information, a selector mechanism identifying first information and second information,
the selector mechanism indicating that the first information is selected,
the first information indicating that the first graphical model is referencing the first instance and that the first instance is referencing the component, and
the second information indicating that the first graphical model is referencing the second instance and that the second instance is referencing the component;
receive, via the selector mechanism, a selection of the second information,
update, based on the selection of the second information, the particular information to obtain updated particular information that indicates that the component is being referenced by the second instance,
the updated particular information including the graphical representation of the component and a graphical representation of the second instance, and
provide the updated particular information for display by the graphical user interface.

14. A method comprising:
executing, using a computing device, a first graphical model that references a plurality of instances of a second graphical model,
the plurality of instances of the second graphical model including:
a first instance of the second graphical model, and
a second instance of the second graphical model;
providing, using the computing device and for display by a graphical user interface, particular information indicating that a component is referenced by the first instance during execution of the first graphical model;
providing, using the computing device and for display by the graphical user interface, a selector mechanism identifying first information and second information,
the selector mechanism indicating that the first information is selected,
the first information indicating that the first graphical model is referencing the first instance and that the first instance is referencing the component, and
the second information indicating that the first graphical model is referencing the second instance and that the second instance is referencing the component;
receiving, using the computing device and via the selector mechanism, a selection of the second information; and
updating, by the computing device and based on the selection of the second information, the particular information to obtain updated particular information that indicates that the component is being referenced by the second instance, the updated particular information including the graphical representation of the component and a graphical representation of the second instance, and the updated particular information being provided for display by the graphical user interface.

15. The method of claim 14, further comprising:
generating a tool tip in the graphical user interface,
the tool tip displaying information relating to:
the first graphical model referencing the first instance and the first instance referencing the component, or
the first graphical model referencing the second instance and the second instance referencing the component.

16. The method of claim 14, where executing the first graphical model includes:
executing the first graphical model with the first instance to obtain a first result,
the first instance using a first set of input data during the execution of the first graphical model;
executing the first graphical model with the second instance to obtain a second result,
the second instance using a second set of input data during the execution of the first graphical model; and
providing the first result and the second result for display by the graphical user interface.

17. The method of claim 14, where executing the first graphical model includes:
receiving user input parameters;
transmitting the user input parameters to the first instance and the second instance; and
executing, using the user input parameters, the first graphical model, the first instance, and the second instance.

18. A method comprising:
importing, using a computing device, a UML (Unified Modeling Language) model into a first graphical model;
executing, using the computing device, a second graphical model that references a plurality of instances of the first graphical model into which the UML model was imported,
the plurality of instances of the first graphical model including:
a first instance, and
a second instance;
providing, using the computing device and for display by a graphical user interface, particular information indicating that a component is referenced by the first instance during execution of the second graphical model,
the particular information including a graphical representation of the component and a graphical representation of the first instance;
providing, using the computing device and for display by the graphical user interface, a selector mechanism identifying first information and second information,
the selector mechanism indicating that the first information is selected,
the first information indicating that the second graphical model is referencing the first instance and that the first instance is referencing the component, and
the second information indicating that the second graphical model is referencing the second instance and that the second instance is referencing the component;
receiving, using the computing device and via the selector mechanism, a selection of the second information; and
updating, using the computing device and based on the selection of the second information, the particular information to obtain updated particular information that indicates that the component is being referenced by the second instance,
the updated particular information including the graphical representation of the component and a graphical representation of the second instance, and
the updated particular information being provided for display by the graphical user interface.

* * * * *